US012238192B2

(12) United States Patent
Linsky et al.

(10) Patent No.: US 12,238,192 B2
(45) Date of Patent: Feb. 25, 2025

(54) CONVEYING MOTION DATA VIA MEDIA PACKETS

(71) Applicant: QUALCOMM Incorporated, San Diego, CA (US)

(72) Inventors: Joel Linsky, San Diego, CA (US); Andre Schevciw, San Diego, CA (US); Mayank Batra, Cambridge (GB); Ferdinando Olivieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/332,788

(22) Filed: May 27, 2021

(65) Prior Publication Data

US 2022/0385748 A1    Dec. 1, 2022

(51) Int. Cl.
*H04L 69/22*   (2022.01)
*H04L 65/75*   (2022.01)
*H04L 69/324*  (2022.01)
*H04R 5/02*    (2006.01)

(52) U.S. Cl.
CPC ................. *H04L 69/324* (2013.01)

(58) Field of Classification Search
None
See application file for complete search history.

(56) References Cited

U.S. PATENT DOCUMENTS

| | | | |
|---|---|---|---|
| 5,568,274 A | 10/1996 | Fujinami et al. | |
| 10,497,346 B2* | 12/2019 | Paranjpe | G06F 3/038 |
| 10,515,337 B1* | 12/2019 | Niranjayan | G06V 20/52 |
| 10,847,014 B1* | 11/2020 | Hutz | G08B 29/046 |
| 2001/0005447 A1 | 6/2001 | Kawamura et al. | |
| 2006/0077996 A1* | 4/2006 | Lee | H04W 4/10 370/441 |
| 2006/0161301 A1* | 7/2006 | Kim | H04N 21/6547 700/245 |
| 2007/0076796 A1* | 4/2007 | Shi | H04N 19/51 375/240.26 |
| 2009/0180469 A1* | 7/2009 | Harada | H04N 7/147 704/235 |
| 2013/0090931 A1 | 4/2013 | Ghovanloo et al. | |
| 2014/0341547 A1* | 11/2014 | Shenoy | H04N 23/60 386/285 |
| 2015/0245164 A1* | 8/2015 | Merrill | H04W 4/06 370/329 |
| 2018/0035234 A1* | 2/2018 | Roach | G02B 27/017 |

(Continued)

OTHER PUBLICATIONS

Partial International Search Report—PCT/US2022/072567—ISA/EPO—Sep. 19, 2022.

(Continued)

*Primary Examiner* — Duc T Duong
(74) *Attorney, Agent, or Firm* — QUALCOMM Incorporated; Espartaco Diaz Hidalgo

(57) ABSTRACT

A device includes a memory configured to store instructions and one or more processors configured to execute the instructions to receive a media packet and to determine, based on a field of the media packet, whether the media packet includes motion data. The one or more processors are also configured to execute the instructions to, based on the media packet including motion data, extract the motion data from the media packet.

29 Claims, 14 Drawing Sheets

(56) References Cited

U.S. PATENT DOCUMENTS

| | | | | |
|---|---|---|---|---|
| 2018/0091923 | A1* | 3/2018 | Satongar | H04R 5/04 |
| 2018/0109338 | A1 | 4/2018 | Walden et al. | |
| 2018/0270150 | A1* | 9/2018 | Gholmieh | H04L 67/025 |
| 2018/0374069 | A1 | 12/2018 | Frankel | |
| 2020/0092576 | A1* | 3/2020 | Li | H04N 19/577 |
| 2020/0236489 | A1* | 7/2020 | Merimaa | H04R 5/033 |
| 2020/0388190 | A1* | 12/2020 | Mochizuki | G09B 19/0038 |
| 2021/0005080 | A1* | 1/2021 | Ogawa | H04W 24/02 |
| 2021/0014078 | A1* | 1/2021 | Thompson | H04N 21/43615 |
| 2021/0099825 | A1 | 4/2021 | Salehin et al. | |
| 2021/0157844 | A1* | 5/2021 | Andon | A63F 13/428 |
| 2021/0334854 | A1* | 10/2021 | Ueno | G06Q 30/0267 |
| 2021/0360070 | A1* | 11/2021 | Cella | H04L 67/565 |
| 2021/0368105 | A1* | 11/2021 | Vankipuram | G06N 20/00 |
| 2021/0390848 | A1* | 12/2021 | Ogawa | G08G 1/0112 |
| 2021/0397249 | A1* | 12/2021 | Kriminger | G06F 3/011 |
| 2022/0218230 | A1* | 7/2022 | Song | G16H 20/30 |
| 2022/0279303 | A1* | 9/2022 | Marculescu | H04R 5/04 |
| 2022/0337780 | A1* | 10/2022 | Huang | G06F 3/011 |
| 2022/0405982 | A1* | 12/2022 | Lin | G06T 7/246 |
| 2023/0031093 | A1* | 2/2023 | Heldner | H04R 5/033 |
| 2023/0039789 | A1* | 2/2023 | Zhu | H04N 21/8146 |
| 2023/0233149 | A1* | 7/2023 | Parker | A61B 5/0205 |
| | | | | 600/301 |

OTHER PUBLICATIONS

International Search Report and Written Opinion—PCT/US2022/072567—ISA/EPO—Dec. 7, 2022.

* cited by examiner

CONVEYING MOTION DATA VIA MEDIA PACKETS

I. FIELD

The present disclosure is generally related to conveying motion data between devices.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing wireless immersive audio to a user. As an example, a headphone device worn by a user can receive streaming audio data from a remote server for playback to the user. To illustrate, the headphone device detects a rotation of the user's head and transmits head tracking information to the remote server. The remote server updates an audio scene based on the head tracking information, generates binaural audio data based on the updated audio scene, and transmits the binaural audio data to the headphone device for playback to the user.

Performing audio scene updates and binauralization at the remote server enables the user to experience an immersive audio experience via a headphone device that has relatively limited processing resources. However, due to latencies associated with transmitting information such as head motion data between the headphone device and the remote server, updating the audio data at the remote server based on the received information, and transmitting the updated binaural audio data to the headphone device, such a system can result in an unnaturally high latency. To illustrate, the time delay between the rotation of the user's head and the corresponding modified spatial audio being played out at the user's ears can be unnaturally long, which may diminish the user's experience.

III. SUMMARY

According to a particular implementation of the techniques disclosed herein, a device includes a memory configured to store instructions and one or more processors configured to execute the instructions to receive a media packet and to determine, based on a field of the media packet, whether the media packet includes motion data. The one or more processors are also configured to execute the instructions to, based on the media packet including motion data, extract the motion data from the media packet.

According to another particular implementation of the techniques disclosed herein, a method includes receiving, at one or more processors, a media packet. The method includes determining, at the one or more processors and based on a field of the media packet, whether the media packet includes motion data. The method also includes, based on the media packet including motion data, extracting the motion data from the media packet.

According to another particular implementation of the techniques disclosed herein, a non-transitory computer-readable medium includes instructions that, when executed by one or more processors, cause the one or more processors to receive a media packet. The instructions, when executed by the one or more processors, also cause the one or more processors to determine, at the one or more processors and based on a field of the media packet, whether the media packet includes motion data. The instructions, when executed by the one or more processors, further cause the one or more processors to, based on the media packet including motion data, extract the motion data from the media packet.

According to another particular implementation of the techniques disclosed herein, an apparatus includes means for receiving, at one or more processors, a media packet. The apparatus includes means for determining, at the one or more processors and based on a field of the media packet, whether the media packet includes motion data. The apparatus also includes means for extracting the motion data from the media packet based on the media packet including motion data.

According to another particular implementation of the techniques disclosed herein, a device includes a memory configured to store instructions and one or more processors configured to execute the instructions to obtain motion sensor data from one or more motion sensors. The one or more processors are also configured to execute the instructions to embed, in a media packet, motion data corresponding to the motion sensor data.

According to another particular implementation of the techniques disclosed herein, a method includes obtaining, at one or more processors, motion sensor data from one or more motion sensors. The method also includes embedding, in a media packet, motion data corresponding to the motion sensor data.

According to another particular implementation of the techniques disclosed herein, a non-transitory computer-readable medium includes instructions that, when executed by one or more processors, cause the one or more processors to obtain motion sensor data from one or more motion sensors. The instructions, when executed by the one or more processors, also cause the one or more processors to embed, in a media packet, motion data corresponding to the motion sensor data.

According to another particular implementation of the techniques disclosed herein, an apparatus includes means for obtaining motion sensor data from one or more motion sensors. The apparatus also includes means for embedding, in a media packet, motion data corresponding to the motion sensor data.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
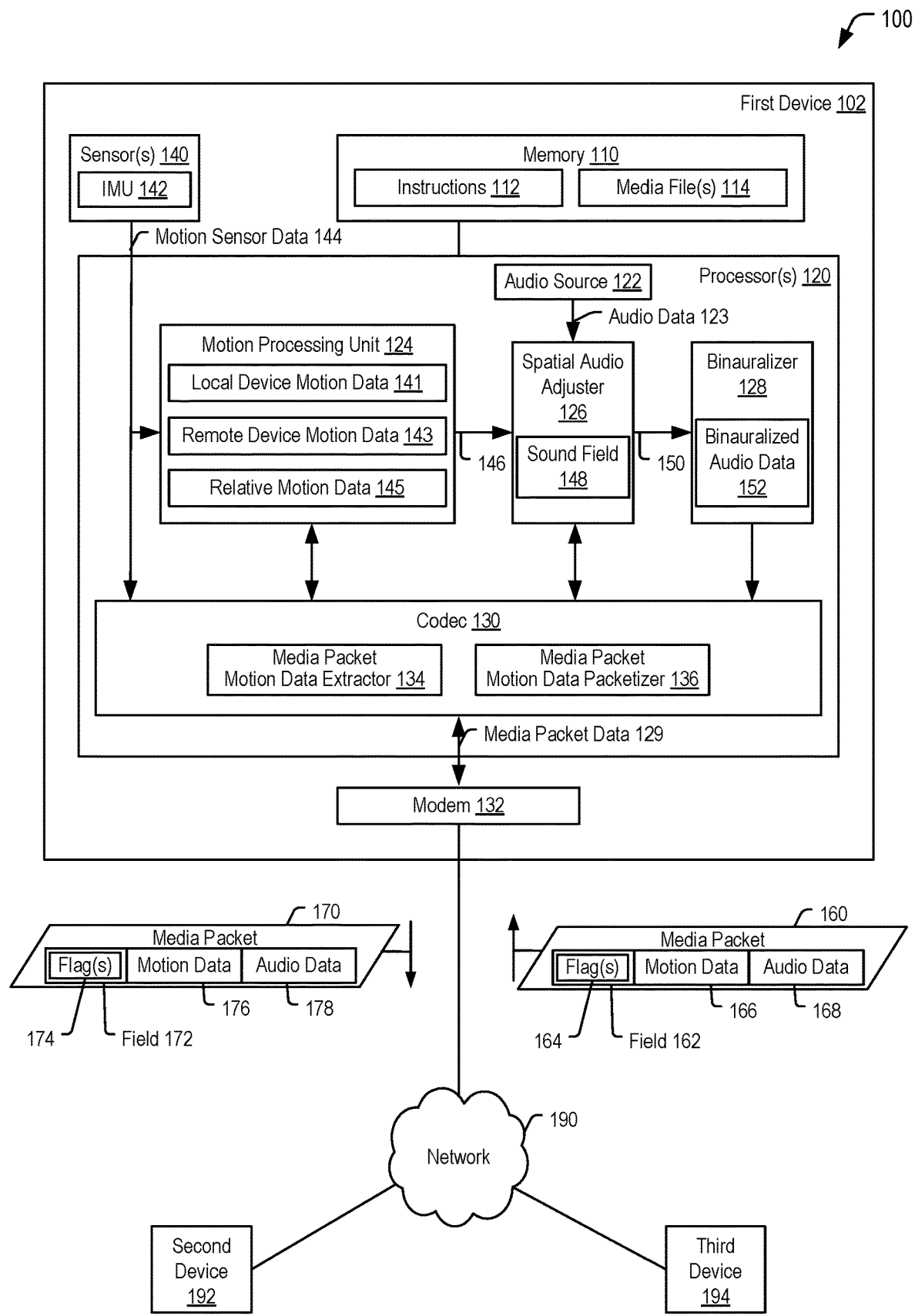
FIG. 1 is a block diagram illustrating an example of an implementation of a system in which motion data is conveyed via media packets, in accordance with some examples of the present disclosure.

Systems and methods are described in which motion data is conveyed between two or more devices using a media packet. In conventional systems, latencies associated with a headphone device transmitting head tracking information to a remote server, updating audio data based on the head tracking information at the remote server, and transmitting updated binaural audio data to the headphone device can result in an unnaturally high motion-to-sound latency and may diminish a user experience. By conveying motion data such as head tracking information via media packets, the motion data can be extracted and processed at a link layer for reduced latency as compared to processing the motion data at an application layer, such as at a host controller.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," " "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

In general, techniques are described for coding of three dimensional (3D) sound data, such as ambisonics audio data. Ambisonics audio data may include different orders of ambisonic coefficients, e.g., first order or second order and more (which may be referred to as higher-order ambisonics (HOA) coefficients corresponding to a spherical harmonic basis function having an order greater than one). Ambisonics audio data may also include mixed order ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (e.g., in symmetric and non-symmetric geometries) often termed 'surround arrays'. One example of such a sound array includes 32 loudspeakers positioned at coordinates on the corners of a truncated icosahedron.

The input to a future Moving Picture Experts Group (MPEG) encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the sound field, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(4+1)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the sound field corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) enables conversion of each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r, \theta_r, \varphi_r\}$.

Referring to FIG. 1, a system 100 includes a first device 102 coupled to a second device 192 and to a third device 194 via a network 190. The network 190 may include one or more of a fifth generation (5G) cellular digital network, a Bluetooth® (a registered trademark of BLUETOOTH SIG, INC., Washington) network, an Institute of Electrical and Electronic Engineers (IEEE) 802.11-type network (e.g., Wi-Fi), one or more other wireless networks, or any combination thereof. In some implementations, the first device 102 is configured to receive motion data 166 via a media packet 160 that originates from the second device 192 or the third device 194. In some implementations, the first device 102 is configured to send motion data 176 to the second device 192 or the third device 194 via a media packet 170.

Figure 13:
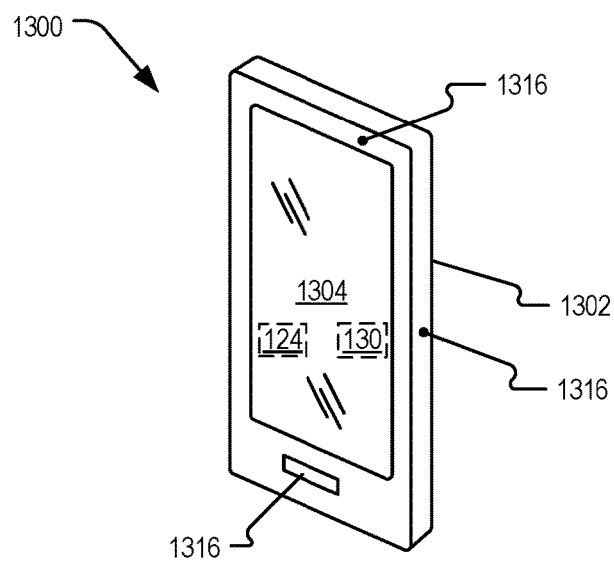
FIG. 13 is a diagram of a mobile device operable to convey motion data via media packets, in accordance with some examples of the present disclosure.
Figure 14:
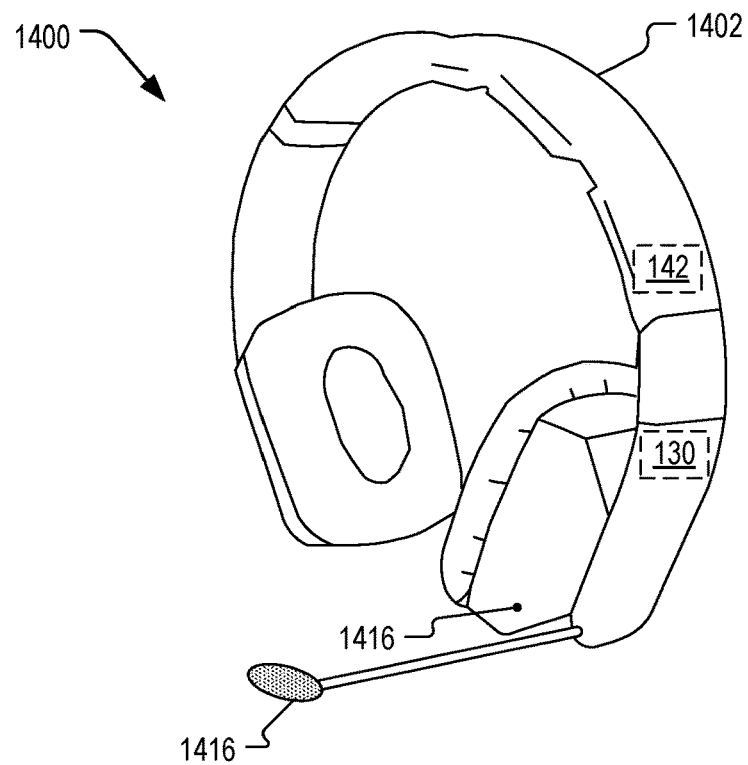
FIG. 14 is a diagram of a headset operable to convey motion data via media packets, in accordance with some examples of the present disclosure.
Figure 15:
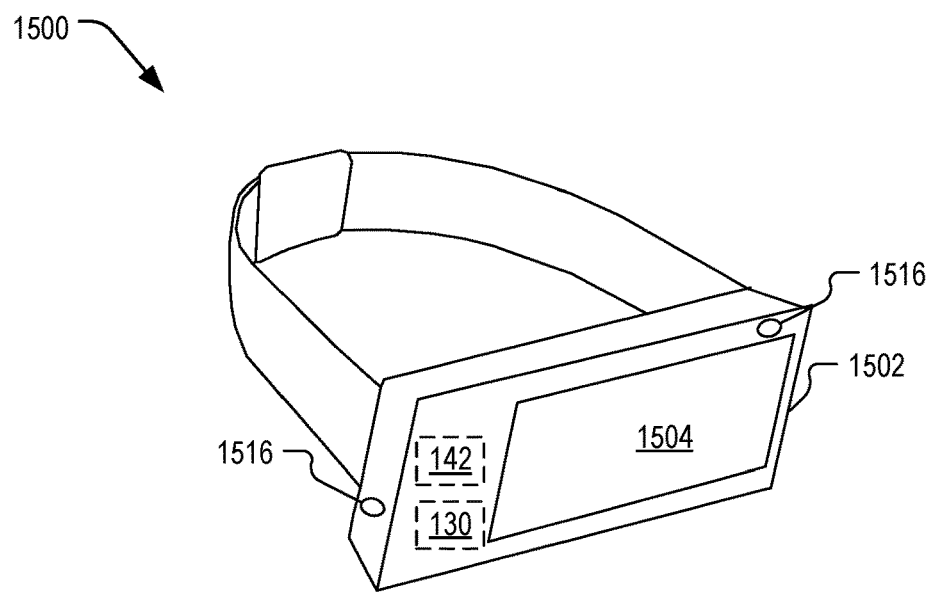
FIG. 15 is a diagram of a wearable electronic device operable to convey motion data via media packets, in accordance with some examples of the present disclosure.
Figure 17:
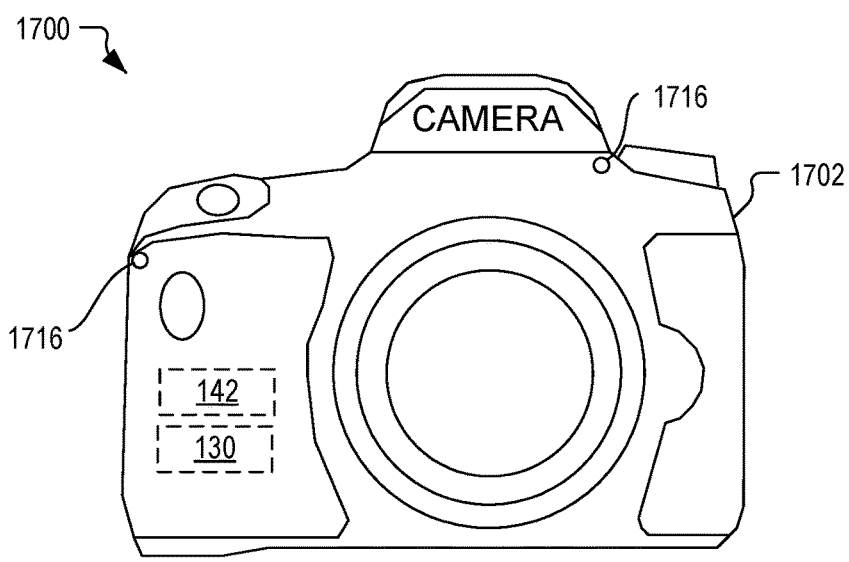
FIG. 17 is a diagram of a camera operable to convey motion data via media packets, in accordance with some examples of the present disclosure.
Figure 18:
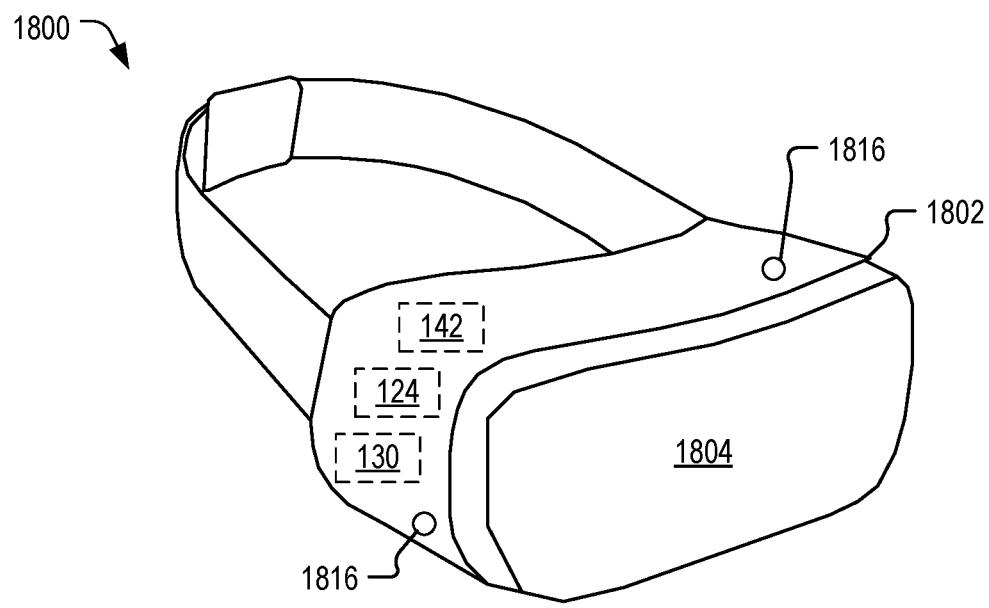
FIG. 18 is a diagram of a headset, such as a virtual reality, mixed reality, or augmented reality headset, operable to convey motion data via media packets, in accordance with some examples of the present disclosure.
Figure 19:
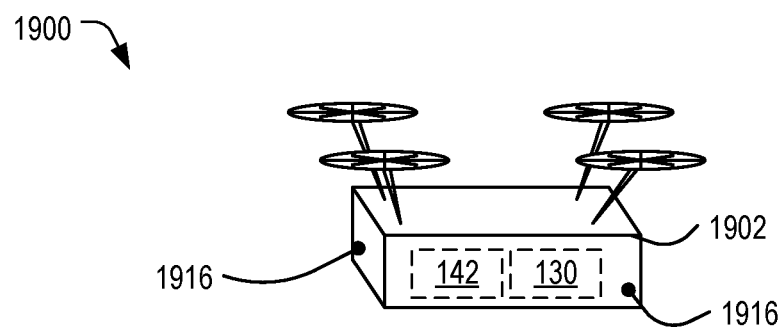
FIG. 19 is a diagram of a first example of a vehicle operable to convey motion data via media packets, in accordance with some examples of the present disclosure.
Figure 20:
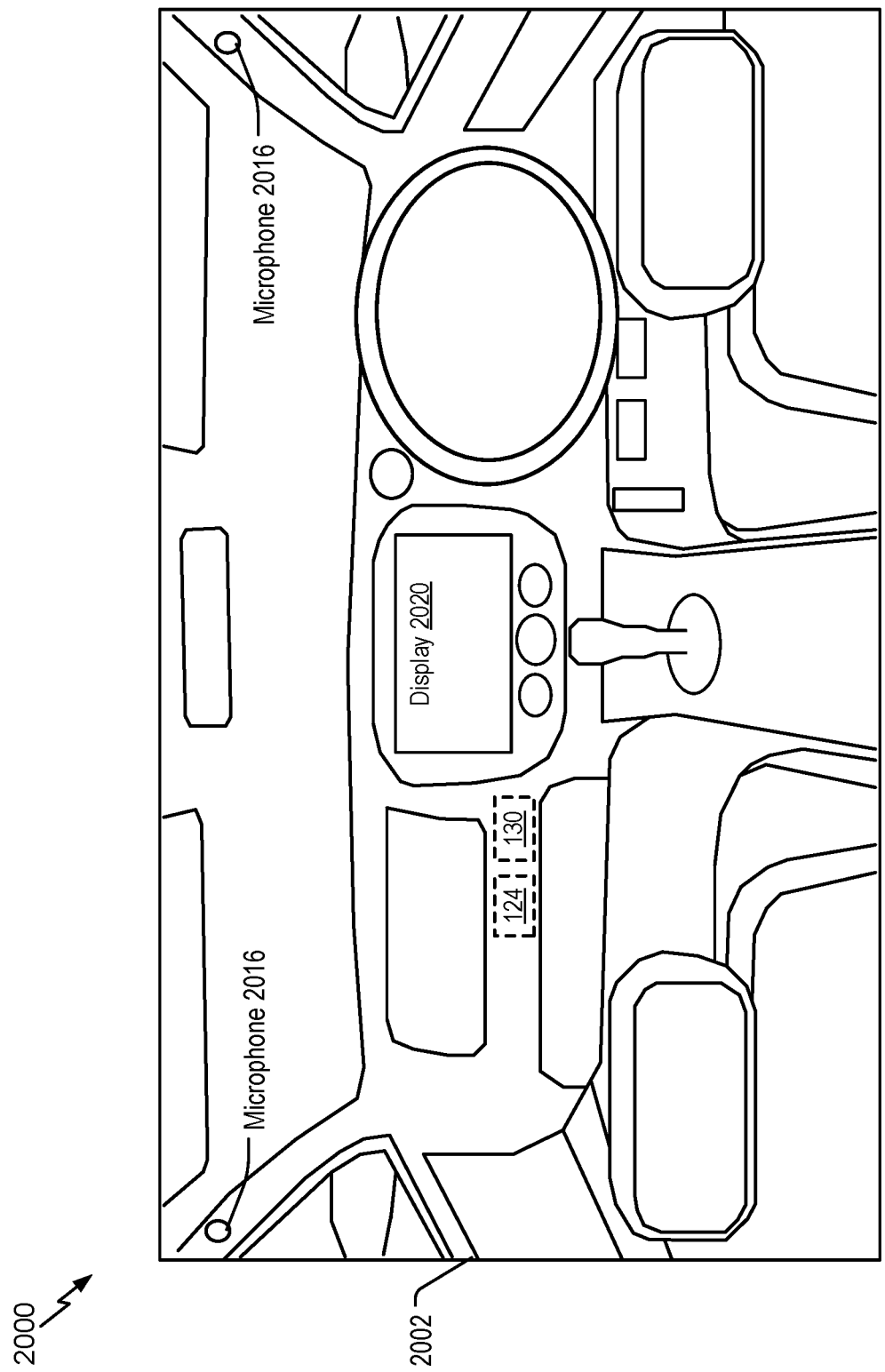
FIG. 20 is a diagram of a second example of a vehicle operable to convey motion data via media packets, in accordance with some examples of the present disclosure.

The first device 102 includes a memory 110, one or more processors 120, one or more sensors 140, and a modem 132 that is configured to enable communication to the second device 192 and to the third device 194 via the network 190. The memory 110 includes instructions 112 that are executable by the one or more processors 120. The memory 110 also includes one or more media files 114. The one or more media files 114 are accessible to the one or more processors 120 as a source of sound information, as described further below. In some examples, the one or more processors 120 are integrated in a portable electronic device, such as a smartphone or tablet computer device, such as illustrated in FIG. 13, a laptop computer, a camera device, such as illustrated in FIG. 17, or other electronic device. In some examples, the one or more processors 120 are integrated in a wearable electronic device, such as a headphone device, as illustrated in FIG. 14, a "smart watch" device, as illustrated in FIG. 15, or an extended reality ("XR") headset (e.g., at least one of a virtual reality ("VR") headset, a mixed reality ("MR") headset, or an augmented reality ("AR") headset), such as illustrated in FIG. 18. In some examples, the one or more processors 120 are integrated in a vehicle, such as illustrated in FIG. 19 and FIG. 20. In some examples, the one or more processors 120 are integrated in a server, such as an edge server.

The one or more sensors 140 are configured to generate motion sensor data 144 indicative of a movement of the first device 102, a pose of the first device 102, or a combination thereof. As used herein, the "pose" of the first device 102 indicates a location of the first device 102, an orientation of the first device 102, or both. The one or more sensors 140 include one or more inertial sensors such as accelerometers, gyroscopes, compasses, positioning sensors (e.g., a global positioning system (GPS) receiver), magnetometers, inclinometers, optical sensors, one or more other sensors to detect location, velocity, acceleration, angular orientation, angular velocity, angular acceleration, or any combination thereof, of the first device 102. In one example, the one or more sensors 140 include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector. In some examples, the one or more sensors 140 include one or more optical sensors (e.g., cameras) to track movement, individually or in conjunction with one or more other sensors (e.g., inertial sensors). In a particular implementation, the one or more sensors 140 include an inertial measurement unit (IMU) 142.

The one or more processors 120 are configured to execute the instructions 112 to perform operations associated with encoding and decoding media packet data, processing motion data, and processing audio data. To illustrate, the one or more processors 120 are configured to receive audio data 123 from an audio source 122. For example, the audio source 122 may correspond to a portion of one or more of the media files 114, a game engine, one or more other sources of sound information, such as audio data captured by one or more microphones integrated in or coupled to the first device 102, or a combination thereof. In an example, the audio data 123 includes ambisonics data and corresponds to at least one of two-dimensional (2D) audio data that represents a 2D sound field or three-dimensional (3D) audio data that represents a 3D sound field. In another example, the audio data 123 includes audio data in a traditional channel-based audio channel format, such as 5.1 surround sound format. In another example, the audio data 123 includes audio data in an object-based format.

The one or more processors 120 are configured to generate motion data 146 based on the motion sensor data 144, based on the motion data 166 received via the media packet 160, or a combination thereof. For example, in some implementations, a motion processing unit 124 is configured to process the motion sensor data 144 to generate local device motion data 141 indicative of a movement of the first device 102, a pose (e.g., orientation) of the first device 102, or a combination thereof. In some implementations, the motion processing unit 124 is configured to process the motion data 166 received via the media packet 160 to generate remote device motion data 143 indicative of a movement of a remote device (e.g., the sender of the media packet 160, such as the second device 192 or the third device 194), a pose of the remote device, or a combination thereof. In some implementations, the motion processing unit 124 is configured to determine relative motion data 145 based on the local device motion data 141 and the remote device motion data 143. For example, in an implementation in which the first device 102 is a handset and the remote device is a headset, the motion processing unit 124 subtracts the local device motion data 141 from the remote device motion data 143 to determine the relative motion data 145, such as to determine an orientation change of a user's head (tracked by the remote device) relative to the user's body (tracked by the first device 102). In various implementations, the motion data 146 generated by the motion processing unit 124 corresponds to the local device motion data 141, the remote device motion data 143, or the relative motion data 145.

In some implementations, the one or more processors 120 are configured to adjust spatial audio data (e.g., the audio data 123 or audio data 168 received at the first device 102 via the media packet 160) based on the motion data 146 generated by the motion processing unit 124 to generate adjusted spatial audio data 150. In an example, a spatial audio adjuster 126 is configured to perform at least one of a translation or a rotation to a sound field 148 represented by the spatial audio data. To illustrate, the spatial audio adjuster 126 may be configured to receive the motion data 146 as a set of angular coordinates indicating a motion (e.g., change in orientation) of the remote device relative to the first device 102, generate a rotation matrix based on the motion data 146, and apply the rotation matrix to the spatial audio data to rotate the sound field 148. In some implementations, the spatial audio adjuster 126 is configured to convert spatial audio data, such as ambisonics data, object-based audio data, channel-based audio data, or a combination thereof, to an equivalent spatial domain (ESD) format prior to adjusting the audio data. In other implementations, the spatial audio adjuster 126 is configured to operate on the spatial audio data (e.g., ambisonics data) without first converting the spatial audio data to an ESD format.

In some implementations, the one or more processors 120 are configured to perform binauralization of the adjusted spatial audio data 150 to generate binauralized audio data 152. In an example, a binauralizer 128 is configured to binauralize the adjusted spatial audio data 150, such as by using one or more head related transfer functions (HRTFs) or binaural room impulse responses (BRIRs) to generate pose-adjusted binaural audio signals. In some implementations, such as when the first device 102 corresponds to a headset or headphone device, the binauralizer 128 is configured to generate loudspeaker gains and output the binauralized audio data 152 to a pair of loudspeakers integrated in the first device 102. In other implementations, such as when the first device 102 corresponds to a handset, the binauralized audio data 152 is transmitted to a remote device via the media packet 170 for playback.

The one or more processors 120 include a codec 130 configured to encode and format audio data (e.g., the audio data 123 from the audio source 122, the adjusted spatial audio data 150 from the spatial audio adjuster 126, or the binauralized audio data 152 from the binauralizer 128), motion data (e.g., the motion sensor data 144 or the motion data 146 from the motion processing unit 124), or a combination thereof, as media packet data 129 for transmission to a remote device, and the one or more processors 120 are configured to initiate transmission of the media packet via the modem 132, such as via an isochronous channel (e.g., a Bluetooth Low Energy channel). The codec 130 is also configured to receive, via the modem 132, media packet data 129 (e.g., corresponding to the media packet 160) from a remote device, convert the media packet data 129 from a compressed format to decompressed format, and output the resulting data to the motion processing unit 124, to the spatial audio adjuster 126, or both.

During operation, in some implementations, the one or more processors 120 receive the media packet 160 from a remote device, such as the second device 192 or the third device 194, via the network 190 and the modem 132. The media packet 160 can include audio data 168, motion data 166, one or more other types of data (e.g., link data, spatial data, etc.,), or a combination thereof. The media packet 160 also includes a field 162 having one or more flags 164 that indicate one or more types of data included in the media packet 160. In a particular implementation, the media packet 160 includes a header and a payload, the field 162 is in the header, and the one or more flags 164 include a flag to indicate the presence or absence of the motion data 166 in the payload. The one or more flags 164 may further indicate the presence or absence of media data in the payload, such as the audio data 168, video data, or another type of media data. To illustrate, the media packet 160 can correspond to one or more of the examples described with reference to FIGS. 2A-2C.

The codec 130 processes the media packet data 129 to extract data embedded in the media packet 160. In an example, the codec 130 includes a media packet motion data extractor 134 configured to determine, based on the field 162 of the media packet 160, whether the media packet 160 includes motion data and, based on the media packet 160 including the motion data 166, extract the motion data 166 from the media packet 160. To illustrate, the media packet motion data extractor 134 can identify, based on the one or more flags 164, whether the media packet 160 includes the motion data 166.

Figure 3:
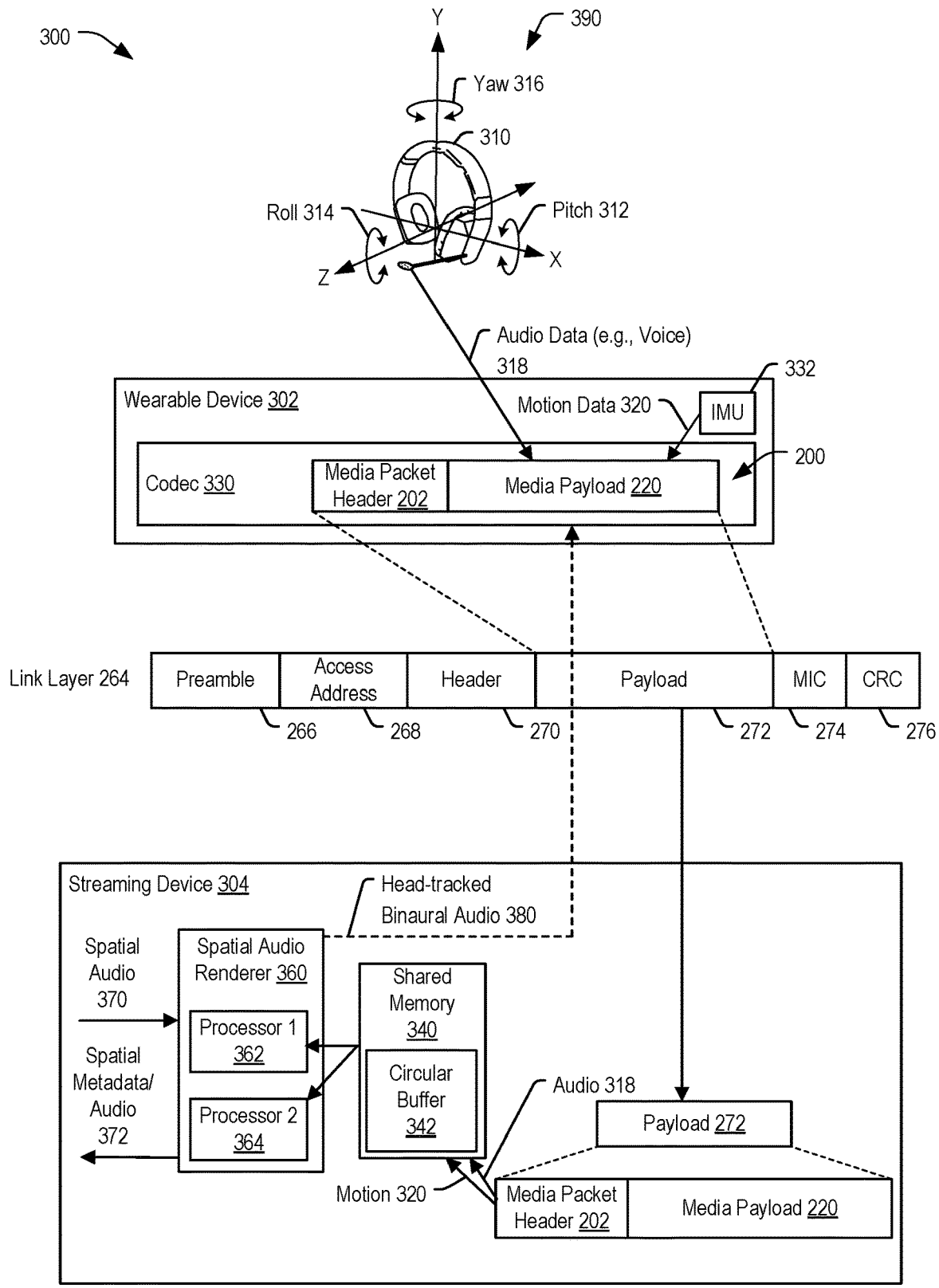
FIG. 3 is a block diagram illustrating another example of an implementation of a system in which motion data is conveyed via media packets, in accordance with some examples of the present disclosure.

In some implementations, the one or more processors 120 are configured to extract the motion data 166 from the media packet 160 and provide the motion data 166 to the motion processing unit 124 according to a "tunnel mode." In the tunnel mode, the media packet 160 is processed at a link layer of a multi-layer software stack to extract the audio data 168 and the motion data 166 and to provide the audio data 168 and the motion data 166 to a shared memory coupled to the one or more processors 120, such as described in further detail with reference to FIG. 3. Extracting and routing the motion data 166 at the link layer, rather than at an application layer of the first device 102, enables the motion data 166 to be processed with reduced latency as compared to systems in which motion data is not embedded in a media packet and processed at the link layer.

In some implementations, the first device 102 functions as a source of streaming audio data to a remote device. In an illustrative example, the first device 102 is a handset, and the second device 192 is a wearable device, such as a headset. The second device 192 sends the media packet 160 that includes the motion data 166 (but may not include the audio data 168), and the one or more processors 120 estimate an orientation of the second device 192 (e.g., a wearable device) based on the motion data 166. To illustrate, a media packet motion data extractor 134 in the codec 130 reads the one or more flags 164 in the media packet data 129, determines from the one or more flags 164 that the media packet 160 includes the motion data 166, extracts the motion data 166 from the media packet data 129, and provides the motion data 166 to the motion processing unit 124. The motion processing unit 124 may generate the local device motion data 141 based on the motion sensor data 144, the remote device motion data 143 based on the motion data 166, and the relative motion data 145 (e.g., an estimated orientation of the second device 192) based on the local device motion data 141 and the remote device motion data 143. The motion processing unit 124 provides the motion data 146 (e.g., the relative motion data 145) to the spatial audio adjuster 126, which adjusts the sound field 148 of the audio data 123 accordingly.

Figure 4:
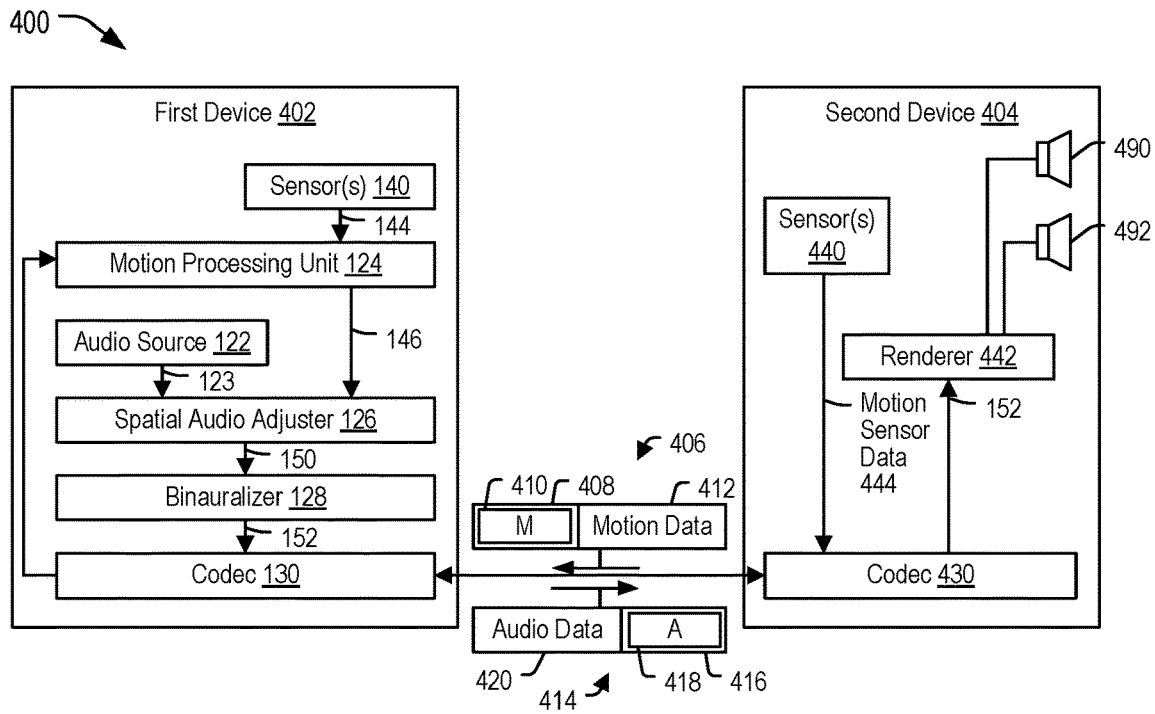
FIG. 4 is a block diagram illustrating another example of an implementation of a system in which motion data is conveyed via media packets, in accordance with some examples of the present disclosure.

In some examples, such as described further with reference to the first device 402 of the example of FIG. 4, the one or more processors 120 binauralize the adjusted spatial audio data 150 at the binauralizer 128 to generate binauralized audio data 152 for transmission to the second device 192. The one or more processors 120 encode and send the resulting binauralized audio data 152 to the second device 192 as audio data 178 in the media packet 170. In other examples, such as described further with reference to the first device 502 of the split rendering example of FIG. 5, the one or more processors 120 encode and send the adjusted spatial audio data 150 to the second device 192 as the audio data 178 in the media packet 170.

Figure 6:
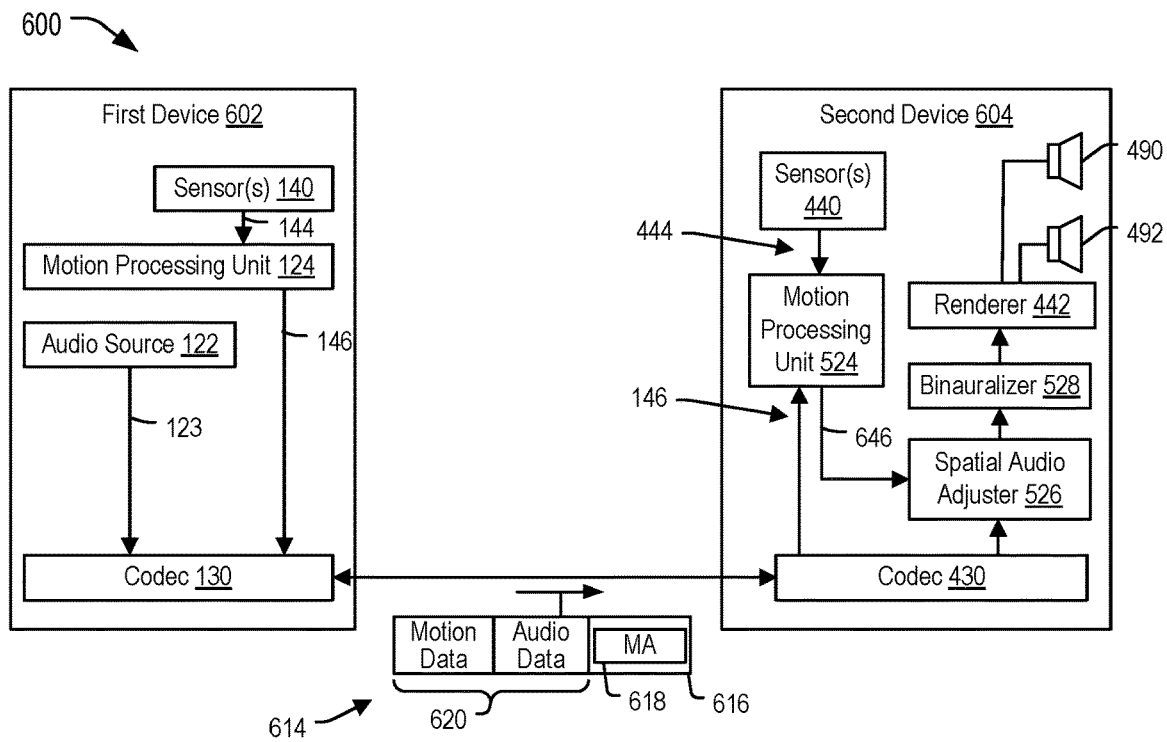
FIG. 6 is a block diagram illustrating another example of an implementation of a system in which motion data is conveyed via media packets, in accordance with some examples of the present disclosure.

In some implementations, such as described further with reference to the example of FIG. 6, the first device 102 (e.g., a handset) functions as a source of streaming audio data, and the second device 192 (e.g., a headset) performs motion compensation prior to playback of the audio data. In such implementations, the audio data 123 is transmitted to the second device 192 as audio data 178 in the media packet 170. A media packet motion data packetizer 136 in the codec 130 embeds motion data 176 in the media packet 170 and sets one or more flags 174 in a field 172 of the media packet 170 to indicate the presence of the motion data 176. In some examples, the motion data 176 includes the motion sensor data 144. In other examples, the motion sensor data 144 is processed to generate the local device motion data 141, and the local device motion data 141 is included in the media packet 170 as the motion data 176.

In other implementations, the first device 102 functions as a recipient of streaming media data. For example, the first device 102 (e.g., a headset) transmits the motion data 176, corresponding to the motion sensor data 144 or to the local device motion data 141, to a streaming media source (e.g., the third device 194) via the media packet 170 and receives binauralized, motion compensated audio data from the streaming media source via the media packet 160, such as described further with reference to the second device 404 of the example of FIG. 4. In another example, the first device 102 (e.g., a headset) transmits the motion data 176 to the streaming media source via the media packet 170 and receives motion compensated spatial audio data from the streaming media source via the media packet 160, which the first device 102 may further adjust, binauralize, and render, such as described further with reference to the second device 504 of FIG. 5.

In other examples, the first device 102 (e.g., a headset) receives motion data and non-motion compensated spatial audio data from a streaming media source (e.g., the third device 194), such as described further with reference to the second device 604 of FIG. 6. To illustrate, the first device 102 may receive the media packet 160 including the motion data 166 (e.g., corresponding to the orientation of the streaming media source) and the audio data 168 in the media packet 160, adjust the audio data 168 based on the motion data 166 and the motion sensor data 144, and binauralize and render the adjusted audio data.

In other implementations, the first device 102 (e.g., a handset) functions as an intermediate device between a streaming media source (e.g., the third device 194) and a headset device (e.g., the second device 192), such as described with reference to the first device 702 of FIG. 7. For example, the first device 102 may receive motion data from the headset device via an incoming media packet 160 and may generate and send the relative motion data 145 (e.g., orientation data indicating the orientation of the headset device) as the motion data 176 in an outgoing media packet 170 to the streaming media source, such as an extended reality (XR) application at a remote server. The first device 102 may receive motion-adjusted spatial audio data from the streaming media source via an incoming media packet 160, binauralize the motion-adjusted spatial audio data, and send the binauralized audio data 152 to the headset device as the audio data 178 in an outgoing media packet 170. In some examples, the first device 102 also receives audio data from the headset, such as user speech and ambient sound captured by microphones of the headset. The first device 102 sends the audio data 168 received from the headset and the relative motion data 145 to the streaming media source as the audio data 178 and the motion data 176, respectively, of the media packet 170, such as described further with reference to the first device 802 of FIG. 8.

Sending and receiving motion data in media packets enables the motion data to be extracted at a link layer and routed to a processing component, reducing a delay that may otherwise be incurred by instead conveying the motion data to a host controller at an application layer. As a result, the motion data can be processed and applied to audio data received in the same media packet. For example, audio data may be transmitted according to a 10 millisecond (ms) or 20 ms frame size, and the reduced latency associated with extracting the motion data from a media packet that also contains a frame of audio data may enable the motion data to be applied to that frame of audio data. Thus, motion compensation of spatial audio can be provided with increased accuracy as compared to a system that performs application layer extraction and processing of the motion data.

Although the media packets 160, 170 include fields 162, 172 having the one or more flags 164, 174 that indicate the presence or absence of motion data, in other implementations the media packets 160, 170 do not include a flag to indicate the presence or absence of motion data. For example, a media packet can include a dedicated field for motion data, and the presence or absence of motion data in the media packet can be determined by determine whether motion data is in the dedicated field.

Although the first device 102 includes the audio source 122, the motion processing unit 124, the spatial audio adjuster 126, and the binauralizer 128, in other implementations the first device 102 omits one or more of the audio source 122, the motion processing unit 124, the spatial audio adjuster 126, or the binauralizer 128. Examples of interactions of devices that include some but not all of the components of the first device 102 are described further with reference to FIGS. 4-8.

Figure 2A:
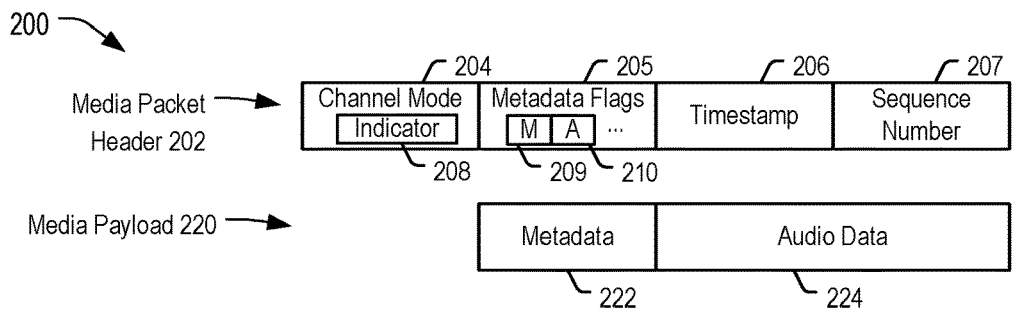
FIG. 2A is a block diagram of an illustrative aspect of a media packet operable to convey motion data, in accordance with some examples of the present disclosure.

FIGS. 2A-2D illustrate examples of packet structures and protocol stacks that can be implemented to transmit the one or more flags 164, the motion data 166, the audio data 168, or a combination thereof, via the network 190. In FIG. 2A, a media packet 200 includes a media packet header 202 and a media payload 220. In some implementations, the media packet 200 corresponds to the media packet 160, the media packet 170, or both, of FIG. 1.

The media packet header 202 includes a channel mode field 204, a metadata flags field 205, a timestamp field 206, and a sequence number field 207. The channel mode field 204 can include a channel mode indicator 208. To illustrate, the channel mode indicator 208 can correspond to metadata indicating a coding mode used to encode audio data 224 in the media payload 220. To illustrate, the channel mode indicator 208 can indicate that the audio data 224 corresponds to a mono signal, a left signal, a right signal, stereo data, ambisonic four-channel data, or higher order ambisonic data, as non-limiting, illustrative examples.

The metadata flags field 205 may correspond to the fields 162, 172 of FIG. 1 and includes one or more metadata flags (e.g., the one or more flags 164, 174) that indicate the presence or absence of various types of metadata 222 or media data in the media payload 220. For example, a first flag 209 may indicate the presence or absence of motion data in the metadata 222, such as the motion data 166, 176. As another example, a second flag 210 may indicate the presence of audio data 224 in the media payload 220, such as the audio data 168, 178. One or more additional metadata flags may be included in the metadata flags field 205, such as a third flag to indicate that spatial information (e.g., based on beamforming associated with speech capture) is included in the metadata 222, a fourth flag to indicate that link data (e.g., transmit power, a received signal strength indicator ("RSSI"), or other data related to communication link strength) is included in the metadata 222, etc. In some implementations, each of the flags in the metadata flags field 205 is represented as a single bit, and a recipient of the media packet 200 can determine the length of the metadata 222 (if any), the length of the audio data 224 (if any), or both, in the media payload 220 based on the particular bits in the metadata flags field 205 that are set.

Figure 2B:
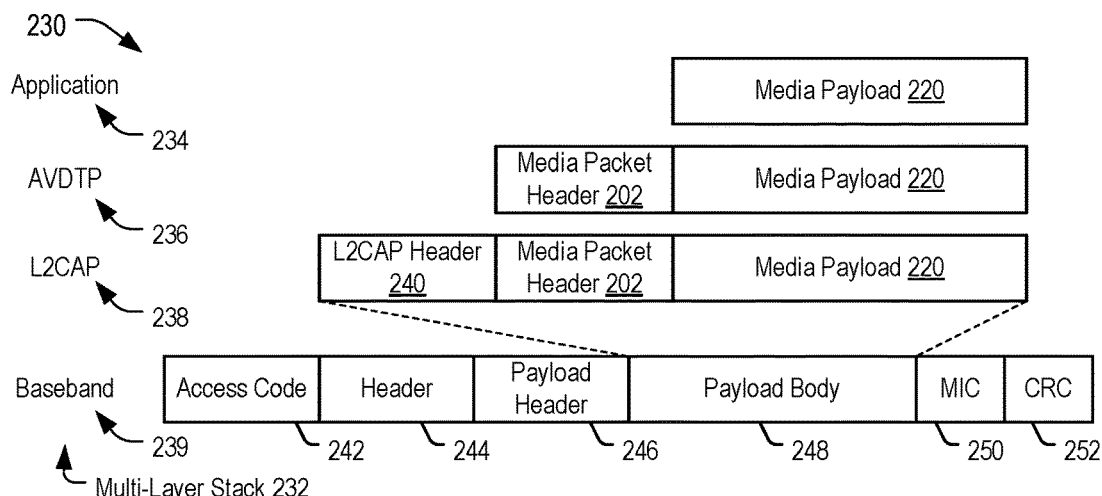
FIG. 2B is a block diagram of an illustrative aspect of the media packet of FIG. 7A in a protocol stack, in accordance with some examples of the present disclosure.
Figure 2C:
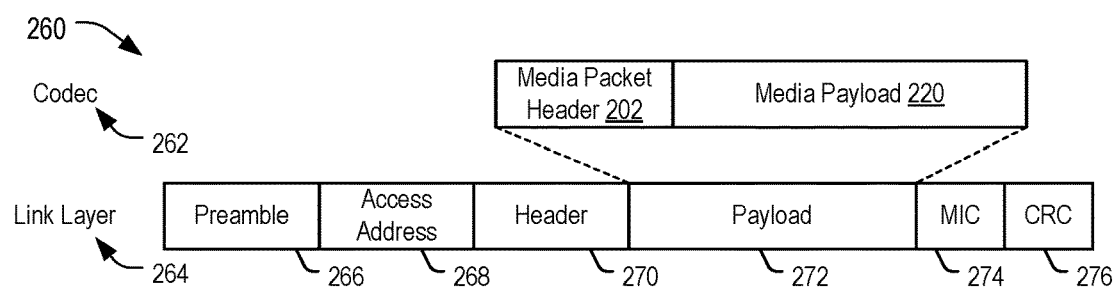
FIG. 2C is a block diagram of another illustrative aspect of the media packet of FIG. 7A in a protocol stack, in accordance with some examples of the present disclosure.
Figure 2D:
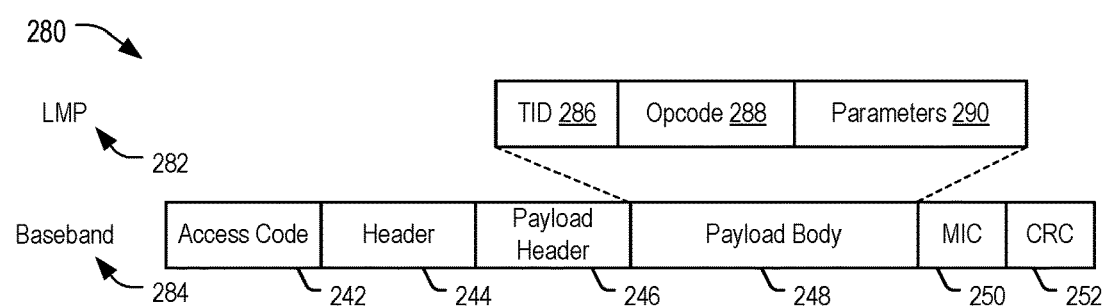
FIG. 2D is a block diagram of an illustrative aspect of a link management packet operable to convey motion data, in accordance with some examples of the present disclosure.

FIGS. 2B, 2C, and 2D depict examples of protocol stacks that enable the media packet 200 to be processed at a low level (e.g., a link layer) of a multi-layer software stack. For example, FIG. 2B illustrates an example 230 in which the media payload 220 is generated at an application layer 234. In an audio video distribution transport protocol (AVDTP) layer 236, the media packet header 202 is added to the media payload 220 to generate the media packet 200. At a link layer control access protocol (L2CAP) layer 238, a L2CAP header 240 is added to the media packet 200 to form a link layer control access protocol packet, which is inserted into a payload body 248 for transport via a baseband layer 239 of a multi-layer stack 232. The payload body 248 is in a packet that also includes an access code field 242, a header 244, a payload header 246 for the payload body 248, an optional message integrity check (MIC) field 250, and a cyclic redundancy check (CRC) field 252. In a particular implementation, the example 230 corresponds to a Bluetooth classic audio implementation.

FIG. 2C illustrates an example 260 in which the media packet 200 is at a codec 262. The media packet 200 is inserted in a payload 272 of a packet, at a link layer 264, that includes a preamble 266, an access address 268, a header 270, the payload 272, an MIC field 274, and a CRC field 276. In a particular implementation, the example 260 corresponds to a Bluetooth low energy (BLE) audio implementation.

In accordance with FIGS. 2B and 2C, the media packet 200 can be sent via unicast, such as a connected isochronous stream (CIS), sent via broadcast, such as broadcast isochronous stream (BIS), or a combination thereof. Alternatively, metadata could be treated as a separate channel and sent on a BLE channel of its own, such as a CIS or BIS. In the case of a CIS, a bidirectional CIS could be used to exchange the data in both directions, allowing flushing of metadata that does not get through in time.

FIG. 2D illustrates an example 280 in which a protocol data unit (PDU) of a link manager protocol (LMP) 282 is used to exchange information between devices, such as between the second device 192 and the first device 102 of FIG. 1. The information can include motion information, link budget, link margin, signal strength, other link data, or spatial information, as illustrative, nonlimiting examples. The link manager protocol 282 PDU can include a transaction identifier (TID) field 286, an opcode 288, and one or more parameters 290 that include the information to be transferred between the devices. The PDU can be embedded in the payload body 248 of a baseband transmission packet that includes an access code field 242, a header 244, a payload header 246, the payload body 248, an optional MIC field, and a CRC field 252, for transmission via a baseband layer 284.

FIG. 3 is a block diagram illustrating another example of an implementation of a system 300 in which motion data is conveyed via media packets, in accordance with some examples of the present disclosure. The system 300 includes a wearable device 302 in communication with a streaming device 304. In a particular implementation, the wearable device 302 corresponds to the second device 192 of FIG. 1, and the streaming device 304 corresponds to the first device 102.

The wearable device 302 is configured to embed motion data 320 that is generated by an IMU 332 into the media payload 220 of the media packet 200 of FIG. 2. As illustrated in a diagram 390, the wearable device 302 may correspond to a headphone device 310, and the motion data 320 may indicate an orientation with respect to a pitch 312, a roll 314, and a yaw 316 of the headphone device. The wearable device 302 includes a codec 330 that is configured to receive the motion data 320 and audio data 318, such as voice data captured by one or more microphones of the headphone device 310, and to generate the media packet 200 including the motion data 320 and the audio data 318 in the media payload 220. In a particular implementation, the codec 330 includes a media packet motion data packetizer, such as the media packet motion data packetizer 136 of the codec 130 of FIG. 1, that inserts the motion data 320 into the media payload 220 and inserts a flag in the media packet header 202 to indicate the presence of the motion data 320.

The streaming device 304 processes the media packet 200 at a link layer of a multi-layer software stack, illustrated as the link layer 264 of FIG. 2. The streaming device 304 is configured to extract the audio data 318 and the motion data 320 from the media packet 200 and to provide the audio data 318 and the motion data 320 to a shared memory 340. The shared memory 340 includes a circular buffer 342 that is accessible to a first processor 362 (e.g., an application processor) and a second processor 364 (e.g., a digital signal processor (DSP)) and that reads and writes PCM and metadata information.

In some implementations, the spatial audio renderer 360 is configured to provide the audio data 318, the motion data 320, or both, to one or more other devices or applications as spatial metadata/audio 372. For example, the spatial metadata/audio 372 may be provided to an AR/VR conference call application, such as described further with reference to FIG. 6.

In some implementations, the spatial audio renderer 360 is configured to output head tracked binaural audio 380 for transmission to the wearable device 302. In an example, the head tracked binaural audio 380 is received from an application, such as an AR/VR conference call application, and forwarded to the wearable device 302. In another example, the spatial audio renderer 360 is configured to process spatial audio 370 (e.g., audio data having a 5.1 format from an audio playback application) based on the motion data 320 to generate the head tracked binaural audio 380. To illustrate, the spatial audio renderer 360 may be configured to process the motion data 320 and to perform spatial audio adjustment and binauralization in a similar manner as described with reference to the motion processing unit 124, the spatial audio adjuster 126, and the binauralizer 128 of FIG. 1. The head tracked binaural audio 380 is transmitted to the wearable device 302 via a media packet 200 for playout out at headphones of the wearable device 302.

Figure 5:
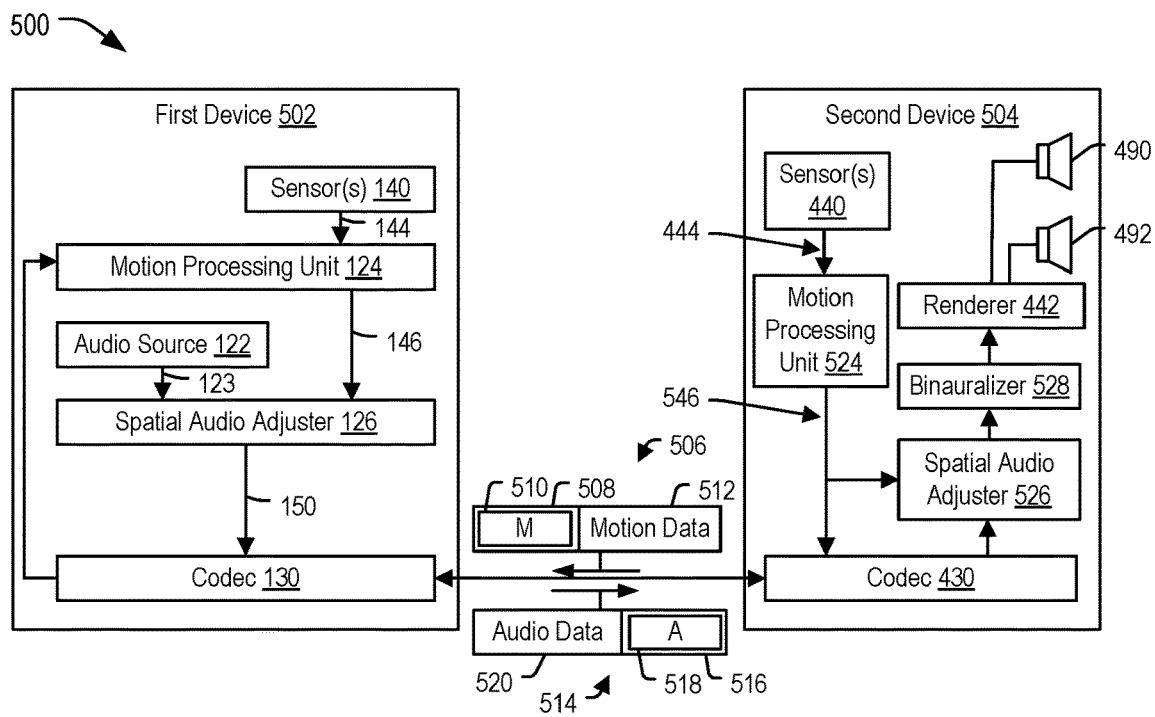
FIG. 5 is a block diagram illustrating another example of an implementation of a system in which motion data is conveyed via media packets, in accordance with some examples of the present disclosure.
Figure 7:
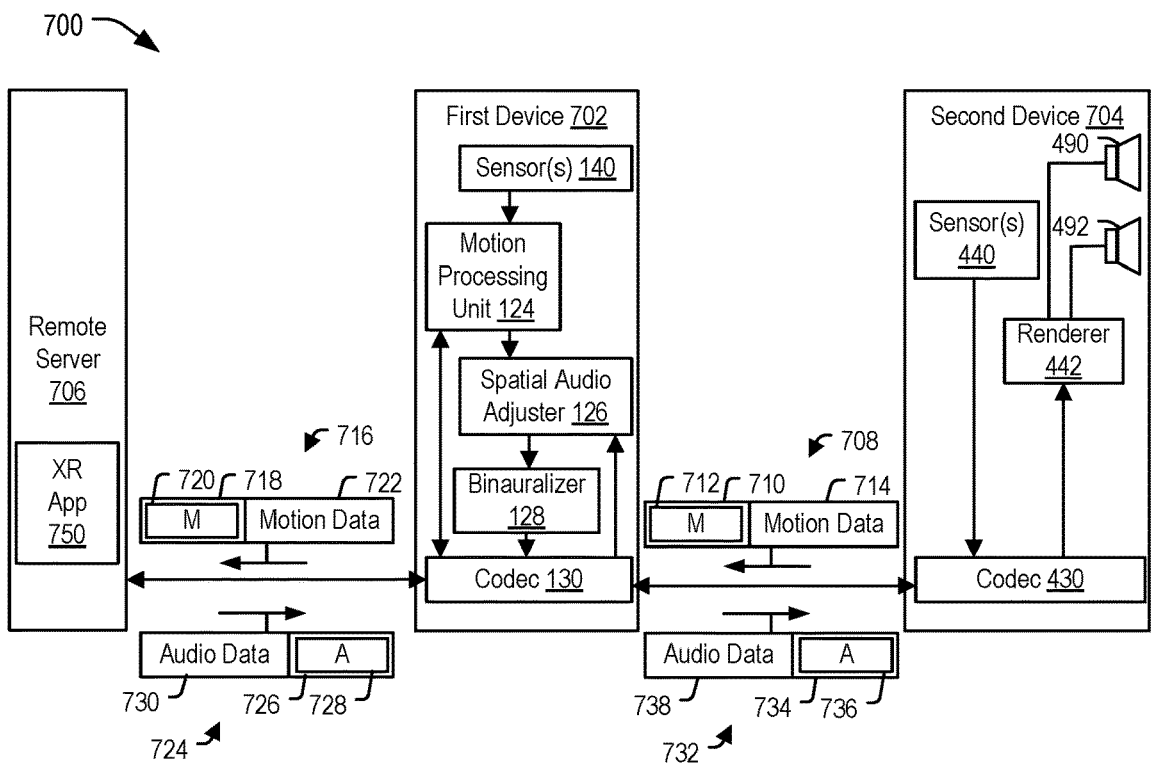
FIG. 7 is a block diagram illustrating another example of an implementation of a system in which motion data is conveyed via media packets, in accordance with some examples of the present disclosure.
Figure 8:
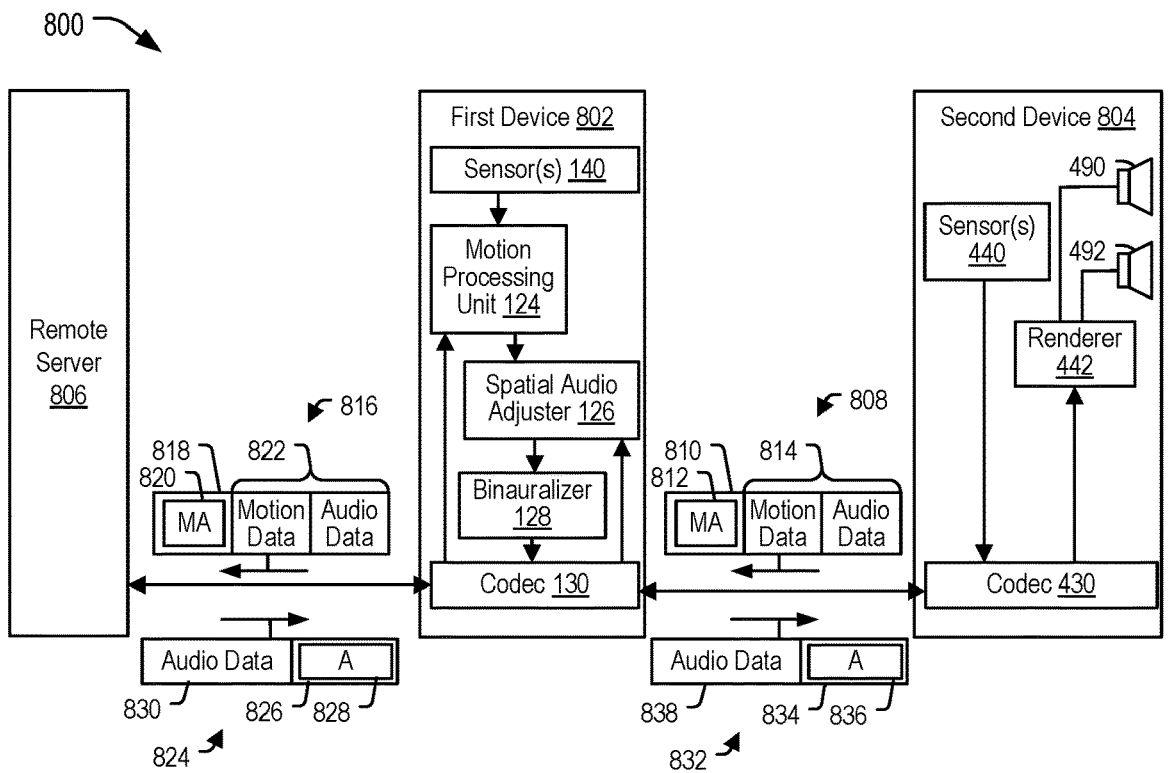
FIG. 8 is a block diagram illustrating another example of an implementation of a system in which motion data is conveyed via media packets, in accordance with some examples of the present disclosure.

FIGS. 4-8 illustrate various implementations in which motion data is conveyed between devices via media packets using components and functionality described with reference to FIGS. 1-3. Audio data is transmitted from a first device (e.g., a handset) for playback at a second device (e.g., a headset) that can change orientations relative to the first device. FIGS. 4, 5, and 6 illustrate two-device examples in which motion compensation is performed at the first device (FIG. 4), at both the first and second device (FIG. 5), and at the second device (FIG. 6). FIGS. 7 and 8 illustrate three-device examples in which motion compensation is performed at the first device and at a remote server.

Referring to FIG. 4, a system 400 includes a first device 402 (e.g., a streaming device, such as a handset) and a second device 404 (e.g., a wearable device, such as a headset). The first device 402 includes the one or more sensors 140, the motion processing unit 124, the audio source 122, the spatial audio adjuster 126, the binauralizer 128, and the codec 130 of the first device 102 of FIG. 1. The second device 404 includes a codec 430, one or more sensors 440, a renderer 442, a first loudspeaker 490, and a second loudspeaker 492. In some implementations, the codec 430 and the one or more sensors 440 operate in a similar manner as the codec 130 and the one or more sensors 140, respectively. The second device 404 may have a headphone device configuration in which the first loudspeaker 490 is configured to be positioned proximate to a first ear of a user while the headphone device is worn by the user, and the second loudspeaker 492 is configured to be positioned proximate to a second ear of the user while the headphone device is worn by the user.

The second device 404 is configured to send a media packet 406 to the first device 402. The media packet 406 includes motion data 412 in a media payload and a field 408 in a media packet header. The field 408 includes a flag 410 that indicates the presence of the motion data 412. For example, the codec 430 is configured to receive motion sensor data 444 from the one or more sensors 440 and generate the media packet 406 including the motion sensor data 444 as the motion data 412.

The first device 402 extracts the motion data 412 at the codec 130 and generates motion data 146 at the motion processing unit 124. The motion data 146 represents relative motion data between the first device 402 and the second device 404 based on the motion data 412 and the motion sensor data 144 from the one or more sensors 140. For example, the first device 402 may estimate an orientation of the second device 404 based on the motion data 412 and further based on the motion sensor data 144. The spatial audio adjuster 126 adjusts the audio data 123 based on the motion data 146, the binauralizer 128 processes the adjusted spatial audio data 150 to generate the binauralized audio data 152, and the codec 130 compresses the binauralized audio data 152 and generates a media packet 414 to send to the second device 404. The media packet 414 includes audio data 420 (e.g., the binauralized audio data 152) in a media payload and a field 416 in a media packet header. The field 416 includes a flag 418 that indicates the presence of the audio data 420.

The second device 404 receives the media packet 414, and the codec 430 extracts the binauralized audio data 152. The renderer 442 outputs loudspeaker gains based on the binauralized audio data 152 to the loudspeakers 490, 492 for playback.

Referring to FIG. 5, a system 500 includes a first device 502 (e.g., a streaming device, such as a handset) and a second device 504 (e.g., a wearable device, such as a headset). The first device 502 includes the one or more sensors 140, the motion processing unit 124, the audio source 122, the spatial audio adjuster 126, and the codec 130 of the first device 102 of FIG. 1. The second device 504 includes the codec 430, the one or more sensors 440, the renderer 442, and the loudspeakers 490, 492 of FIG. 4. The second device 504 also includes a motion processing unit 524 and a spatial audio adjuster 526, which operate in a similar manner as the motion processing unit 124 and the spatial audio adjuster 126, respectively.

The second device 504 is configured to send a media packet 506 to the first device 502. The media packet 506 includes motion data 512 in a media payload and a field 508 in a media packet header. The field 508 includes a flag 510 that indicates the presence of the motion data 512. For example, the motion processing unit 524 processes the motion sensor data 444 and generates motion data 546. The codec 430 receives the motion data 546 and generates the media packet 506 including the motion data 546 as the motion data 512.

The first device 502 extracts the motion data 512 at the codec 130 and generates the adjusted spatial audio data 150 in a similar manner as described for FIG. 4. The codec 130 compresses the adjusted spatial audio data 150 and generates a media packet 514 that includes audio data 520 (e.g., the adjusted spatial audio data 150) in a media payload and a field 516 including a flag 518 indicating the presence of the audio data 520.

The second device 504 receives the media packet 514, and the codec 430 extracts the adjusted spatial audio data 150. The spatial audio adjuster 526 may perform an additional adjustment of the adjusted spatial audio data 150 based on the motion data 546. For example, an orientation of the second device 504 (or a predicted orientation of the second device 504) may have changed during the time period between sending the media packet 506 and receiving the media packet 514. The motion data 546 may indicate the current orientation of the second device 504 and may be used to update the adjusted spatial audio data 150. The updated adjusted spatial audio data is processed at the binauralizer 528 to generate binauralized audio data, which is processed by the renderer 442 to drive the loudspeakers 490, 492.

Referring to FIG. 6, a system 600 includes a first device 602 (e.g., a streaming device, such as a handset) and a second device 604 (e.g., a wearable device, such as a headset). The first device 602 includes the one or more sensors 140, the motion processing unit 124, the audio source 122, and the codec 130 of the first device 102 of FIG. 1. The second device 604 includes the codec 430, the one or more sensors 440, the motion processing unit 524, the spatial audio adjuster 526, the binauralizer 528, the renderer 442, and the loudspeakers 490, 492, as described with reference to FIG. 4 and FIG. 5.

The codec 130 of the first device 602 generates a media packet 614 that includes a media payload 620 and a field 616 including one or more flags 618. The payload 620 includes audio data corresponding to a compressed version of the audio data 123 and also includes motion data corresponding to the motion data 146 generated based on the motion sensor data 144. The one or more flags 618 indicate the presence of the motion data and the audio data in the payload.

The second device 604 receives the media packet 614, and the codec 430 extracts the audio data 123 and the motion data 146. The motion processing unit 524 generates relative motion data 646 based on the motion data 146 and the motion sensor data 444. The spatial audio adjuster 526 adjusts the audio data 123 based on the relative motion data 646. The updated adjusted spatial audio data is processed at the binauralizer 528 to generate binauralized audio data, which is processed by the renderer 442 to drive the loudspeakers 490, 492.

Referring to FIG. 7, a system 700 includes a first device 702 (e.g., a streaming device, such as a handset), a second device 704 (e.g., a wearable device, such as a headset), and a remote device illustrated as a remote server 706. The first device 702 includes the one or more sensors 140, the motion processing unit 124, the spatial audio adjuster 126, the binauralizer 128, and the codec 130 of the first device 102 of FIG. 1. The second device 704 includes the codec 430, the one or more sensors 440, the renderer 442, and the loudspeakers 490, 492.

The codec 430 of the second device 704 generates a media packet 708 that includes motion data 714 in a media payload and also includes a field 710 including one or more flags 712 in a media packet header indicating the presence of the motion data 714. The motion data 714 corresponds to the motion sensor data generated by the one or more motion sensors 440.

The first device 702 receives the media packet 708, and the codec 130 extracts the motion data 714. The motion processing unit 124 generates relative motion data based on the received motion data 714 and motion sensor data from the one or more sensors 140. The codec 130 generates a media packet 716 that includes motion data 722 in a media payload and also includes a field 718 including one or more flags 720 in a media packet header indicating the presence of the motion data 722. The motion data 722 corresponds to the relative motion data generated by the motion processing unit 124.

The remote server 706 receives the media packet 716 and extracts the motion data 722. The motion data 722 is processed at an application, such as an XR application 750. To illustrate, the motion data 722 can be used to track a location, orientation, direction of movement, or any combination thereof, of the second device 704 and send appropriate audio data 730 (e.g., spatial audio data corresponding to virtual audio at the location of the second device 704) to the first device 702. The audio data 730 is embedded in a media packet 724 that also includes a field 726 including one or more flags 728 indicating the presence of the audio data 730.

In implementations in which the audio data 730 includes motion-compensated binaural audio data, the first device 702 forwards the audio data 730, as audio data 738 indicated by one or more flags 736 in a field 734 of a media packet 732, to the second device 704 for playback. In an implementation in which the audio data 730 includes spatial audio data, the first device 702 processes the audio data 730 at the spatial audio adjuster 126 based on an estimated orientation of the second device 704 (e.g., using the motion data 714 or more recently received motion data from the second device 704), the binauralizer 128 processes the adjusted spatial audio data and generates binauralized audio data, which the codec 130 compresses and inserts into the media packet 732 as the audio data 738.

The second device 704 receives the media packet 732 and extracts the audio data 738, which is processed by the renderer 442 to drive the loudspeakers 490, 492.

Referring to FIG. 8, a system 800 includes a first device 802 (e.g., a streaming device, such as a handset), a second device 804 (e.g., a wearable device, such as a headset), and a remote device illustrated as a remote server 806. The first device 802 includes the one or more sensors 140, the motion processing unit 124, the spatial audio adjuster 126, the binauralizer 128, and the codec 130 of the first device 102 of FIG. 1. The second device 804 includes the codec 430, the one or more sensors 440, the renderer 442, and the loudspeakers 490, 492.

The codec 430 of the second device 804 generates a media packet 808 that includes motion data and audio data in a media payload 814 and also includes a field 810 including one or more flags 812 in a media packet header indicating the presence of the motion data and the audio data. The motion data in the media payload 814 corresponds to the motion sensor data generated by the one or more motion sensors 440, and the audio data in the media payload 814 may correspond to user speech and ambient sound captured by one or more microphones of the second device 804, such as during a VR teleconference.

The first device 802 receives the media packet 808, and the codec 130 extracts the motion data and the audio data from the media payload 814. The motion processing unit 124 generates relative motion data based on the received motion data and motion sensor data from the one or more sensors 140. The codec 130 generates a media packet 816 that includes motion data and audio data in a media payload 822 and also includes a field 818 including one or more flags 820 that indicate the presence of the motion data and the audio data in the media payload 822. The motion data in the media payload 822 corresponds to the relative motion data generated by the motion processing unit 124, and the audio data in the media payload 822 corresponds to the audio data from the media payload 814 (e.g., sound captured by microphones of the second device 804).

The remote server 806 receives the media packet 816 and extracts the motion data and the audio data from the media payload 822. The motion data and audio data are processed at an application, such as an XR teleconference application. To illustrate, the motion data can be used to track a location, orientation, direction of movement, or any combination thereof, of the second device 804 and to process the audio data for playback to another participant of an XR teleconference (e.g., for multiple conference attendees positioned around a virtual conference table) and to send appropriate audio data 830 (e.g., spatial audio data corresponding to speech from one or more other participants around the virtual conference table) to the first device 802. The audio data 830 is embedded in a media packet 824 that also includes a field 826 including one or more flags 828 indicating the presence of the audio data 830.

The first device 802 can forward the audio data 830 to the second device 804 as audio data 838 in a media packet 832, or can motion-compensate and binauralize the audio data 830 to generate the audio data 838, for playback at the second device 804 in a similar manner as described with reference to FIG. 7. The media packet 832 also includes a field 834 having one or more flags 836 that indicate the presence of the audio data 838.

Figure 9:
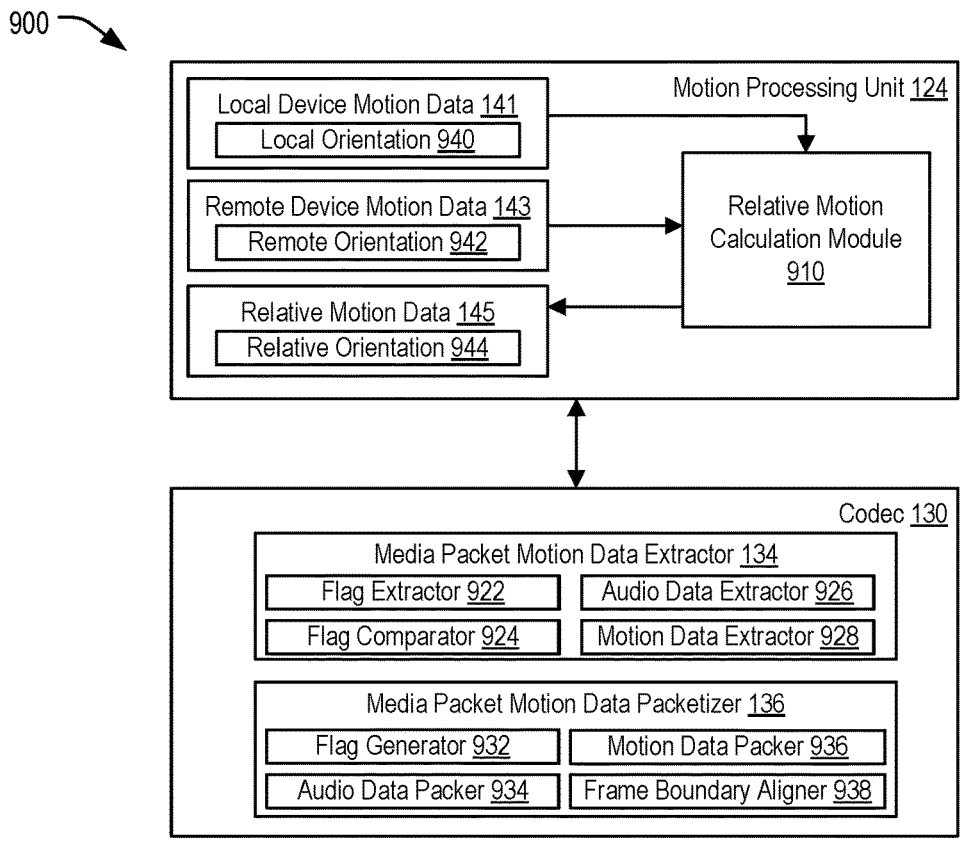
FIG. 9 is a block diagram illustrating an example of components that may be implemented in the first device of FIG. 1, in accordance with some examples of the present disclosure.

Referring to FIG. 9, an example 900 of a particular implementation of the motion processing unit 124 and the codec 130 of the first device 102 of FIG. 1 is shown. The motion processing unit 124 is configured to estimate an orientation of the first device 102, illustrated as local orientation 940, based on the motion sensor data 144 from the one or more motion sensors 140 of the first device 102. The motion processing unit 124 is also configured to estimate an orientation, illustrated as a remote orientation 942, of a remote device (e.g., a wearable device) based on motion data received via the codec 130, such as the motion data 166 of FIG. 1. A relative motion calculation module 910 is configured to estimate a relative orientation 944 of the remote device, such as by subtracting the local orientation 940 from the remote orientation 942.

Depending on the application, the remote orientation 942 or the relative orientation 944 may be used as an estimate of the orientation of the remote device. For example, in an implementation in which the motion processing unit 124 is implemented in a handset of a user, the remote device corresponds to a VR headset worn by the user, and the user is walking through a virtual environment, the remote orientation 942 may be used as the estimated orientation of the VR headset for spatial compensation of virtual audio to play out to the user. As another example, in an implementation in which the user is engaging with virtual objects while travelling on a train, the relative orientation 944 may be used as the estimated orientation of the VR headset to cancel out the effect of the train's motion when generating the spatially compensated virtual audio.

The media packet motion data extractor 134 includes a flag extractor 922, a flag comparator 924, an audio data extractor 926, and a motion data extractor 928. The flag extractor 922 is configured to determine values of the one or more flags indicating the presence of motion data, audio data, or both, in a received media packet. For example, the flag extractor 922 may be configured to locate and read the metadata flags field 205, including the first flag 209 and the second flag 210, from the media packet header 202 of FIG. 2A. The flag comparator 924 is configured to compare the values of the extracted flags to one or more predetermined values to determine whether the extracted flags indicate the presence or absence of motion data in the media packet and to determine whether the extracted flags indicate the presence or absence of audio data in the media packet. The audio data extractor 926, in response to a determination by the flag comparator 924 that the media packet includes audio data, is configured to extract the audio data from the media packet. The motion data extractor 928, in response to a determination by the flag comparator 924 that the media packet includes motion data, is configured to extract the motion data from the media packet. An example of flag extraction and comparison is described in further detail with reference to FIG. 11.

The media packet motion data packetizer 136 includes a flag generator 932, an audio data packer 934, a motion data packer 936, and a frame boundary aligner 938. The flag generator 932 is configured to determine values of one or more flags to be included in a media packet based on whether the media packet is to include audio data, motion data, one or more other types of data, or a combination thereof. For example, the flag generator 932 may be configured to set values of the metadata flags, including the first flag 209 and the second flag 210, in the media packet header 202 of FIG. 2A. The audio data packer 934, in response to a determination that the media packet is to include audio data, is configured to add the audio data into the media packet, such as in a media payload of the media packet. The motion data packer 936, in response to a determination that the media packet is to include motion data, is configured to add the motion data into the media packet, such as in a metadata portion of the media payload. In some implementations, positions of the motion data, the audio data, or both, in the media payload are determined further based on the presence or absence of other types of metadata in the media packet, such as link data that may also be included in the metadata portion of the media payload.

The frame boundary aligner 938 is configured to align the media packet with an audio frame boundary. For example, the motion data may be received from motion sensors at a motion sensing rate (e.g., every 100 ms) that differs from and is not synchronized with an audio frame boundary (e.g., a 10 ms or 20 ms frame boundary). The frame boundary aligner 938 may include one or more buffers to enable temporal alignment of the motion data and the audio data within the media packet with the audio frame boundary.

Figure 10:
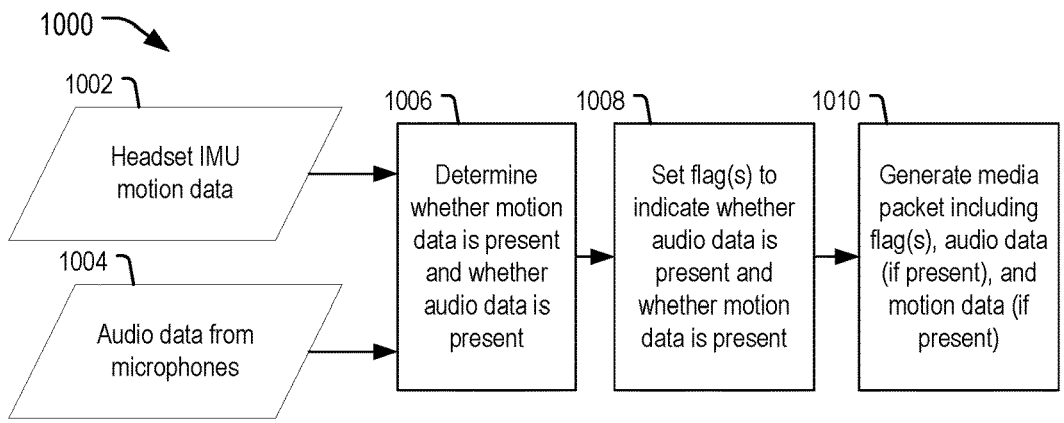
FIG. 10 is a flowchart illustrating an example of a method of generating a media packet that includes motion data.

FIG. 10 is a flowchart illustrating an example of a method 1000 of generating a media packet that includes motion data. In some implementations, the method 1000 is performed by the first device 102 of FIG. 1 configured as a headset device that includes one or more microphones and an IMU, such as the second device 804 of FIG. 8.

The method 1000 may include receiving IMU data 1002 (e.g., headset IMU data) and may also include receiving audio data 1004 from one or more microphones. For example, the codec 430 of FIG. 8 may receive the IMU data 1002 from the one or more sensors and may receive the audio data from one or more microphones integrated in the second device 804.

The method 1000 includes, at block 1006, determining whether there is motion data to be sent and whether there is audio data to be sent. The method 1000 includes, at block 1008, setting one or more flags to indicate whether audio data is present and whether motion data is present. In a particular implementation, the one or more flags correspond to the first flag 209 and the second flag 210 of FIG. 2.

The method 1000 includes, at block 1010, generating the media packet including the one or more flags, the audio data 1004 (if present), and the IMU data 1002 (if present). For example, the codec 130 may generate the media packet 200 that includes the one or more flags set in the metadata flags field 205 of the media packet header 202 by the flag generator 932 of the media packet motion data packetizer 136, the motion data 1002 included as the metadata 222 in the media payload 220 by the motion data packer 936, and the audio data 1004 included as the audio data 224 in the media payload 220 of the media packet 200 by the motion data packer 936.

Figure 11:
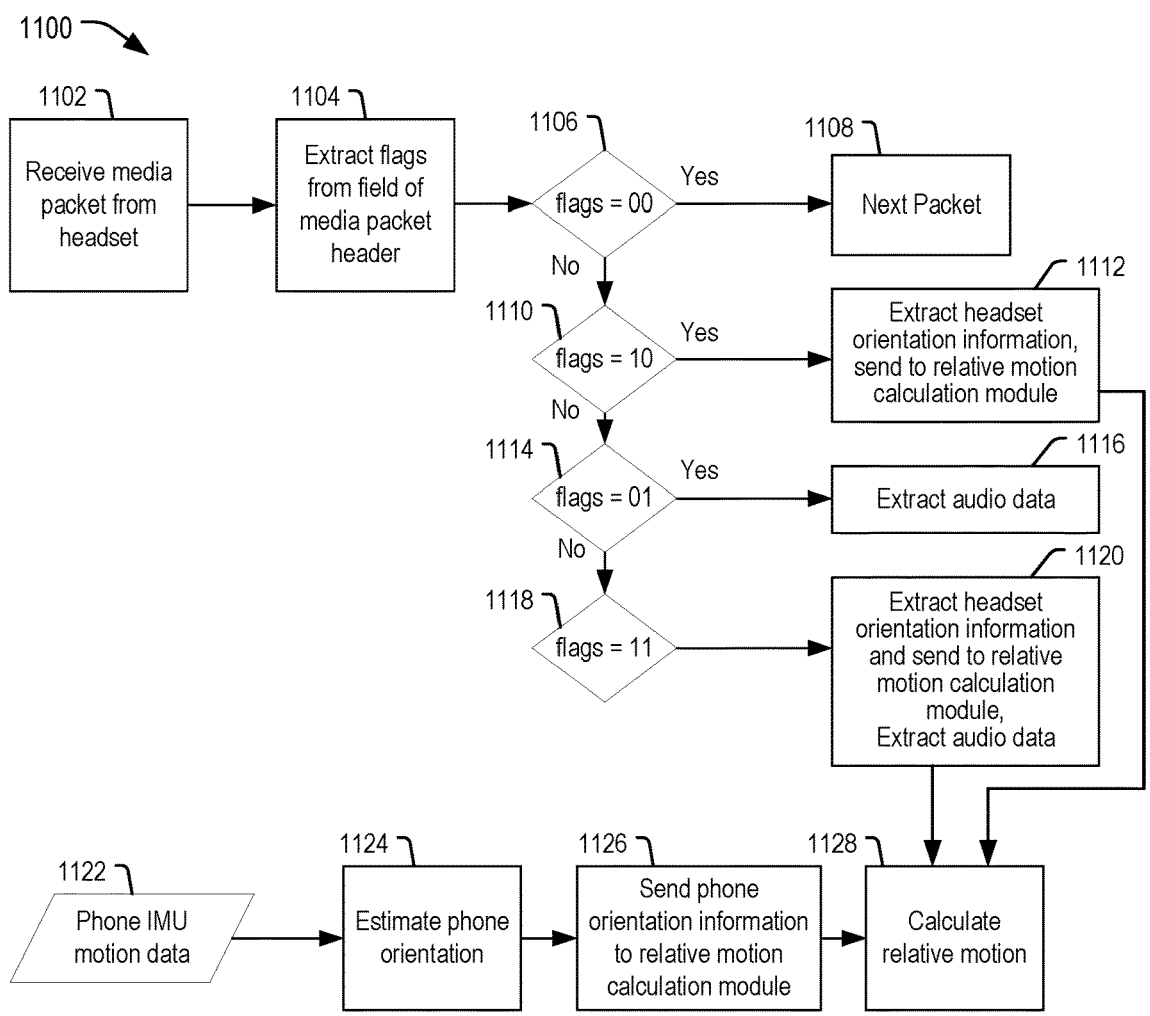
FIG. 11 is a flowchart illustrating an example of a method of determining relative motion based on motion data received via a media packet.

FIG. 11 is a flowchart illustrating an example of a method 1100 of determining a relative motion based on motion data received via a media packet. In some implementations, the method 1100 is performed by the first device 102 of FIG. 1 configured as a phone (e.g., a handset device).

The method 1100 includes, at block 1102, receiving a media packet from a headset, such as the media packet 160 of FIG. 1. The method 1100 includes, at block 1104, extracting flags from a field of the media packet header, such as by the flag extractor 922 of FIG. 9 operating on the media packet 200 of FIG. 2. A determination is made, at 1106, as to whether the flag values match the two-bit value '00.' For example, the flag comparator 924 of FIG. 9 may compare the first bit of '00' to the first flag 209 (corresponding to motion data) and may compare the second bit of '00' to the second flag 210 (corresponding to audio data). In response to the flags matching '00,' the media packet is determined to not include audio data and to not include motion data, and processing advances to a next media packet, at block 1108.

Otherwise, in response to the flags not matching '00,' a determination is made, at 1110, as to whether the flag values match the two-bit value '10.' For example, the flag comparator 924 of FIG. 9 may compare the first bit of '10' to the first flag 209 (corresponding to motion data) and may compare the second bit of '10' to the second flag 210 (corresponding to audio data). In response to the flags matching '10,' the media packet is determined to include motion data and to not include audio data. Motion data (e.g., headset orientation data) is extracted from the media packet and sent to a relative motion calculation module (e.g., the relative motion calculation module 910 of the motion processing unit 124 in FIG. 9), at block 1112.

Otherwise, in response to the flags not matching '10,' a determination is made, at 1114, as to whether the flag values match the two-bit value '01.' For example, the flag comparator 924 of FIG. 9 may compare the first bit of '01' to the first flag 209 (corresponding to motion data) and may compare the second bit of '01' to the second flag 210 (corresponding to audio data). In response to the flags matching '01,' the media packet is determined to include audio data and to not include motion data, and the audio data is extracted from the media packet, such as by the audio data extractor 926 of FIG. 9, at block 1116.

Otherwise, in response to the flags not matching '01,' a determination is made, at 1118, that the flag values match the two-bit value '11.' For example, the flag comparator 924 of FIG. 9 may compare the first bit of '11' to the first flag 209 (corresponding to motion data) and may compare the second bit of '11' to the second flag 210 (corresponding to audio data). In response to the flags matching '11,' the media packet is determined to include audio data and motion data. Headset orientation data (e.g., corresponding to the remote orientation 942) is extracted from the media packet and sent to the relative motion calculation module, and the audio data is extracted from the media packet, at block 1120.

The method 1100 also includes, based on IMU data 1122 (e.g., the motion sensor data 144 of a phone), estimating the local device's orientation (e.g., the local orientation 940 of the phone), at block 1124. The method 1100 includes, at block 1126, sending the local device's orientation information to the relative motion calculation module and, at block 1128, calculating the relative motion, such as the relative orientation 944 of FIG. 9.

Although the method 1100 includes performing one or more sequential comparisons of the extracted flags to two-bit values, in other implementations each of the individual flags (e.g., the first flag 209 and the second flag 210) are independently processed to determine, for example, whether the first flag indicates the presence of motion data, whether the second flag indicates the presence of audio data, or both. Although FIG. 11 illustrates the left-most bit of the flags value as corresponding to motion data and the right-most bit of the flags value as corresponding to audio data, in other implementations the flags are arranged in different orders. Although the method 1100 illustrates that a flag having a '1' value corresponds to the presence of particular data in the media packet and the flag having a '0' value corresponds to the absence of the particular data in the media packet, in other implementations other values may be used to indicate the presence or absence of data in the media packet.

Figure 12:
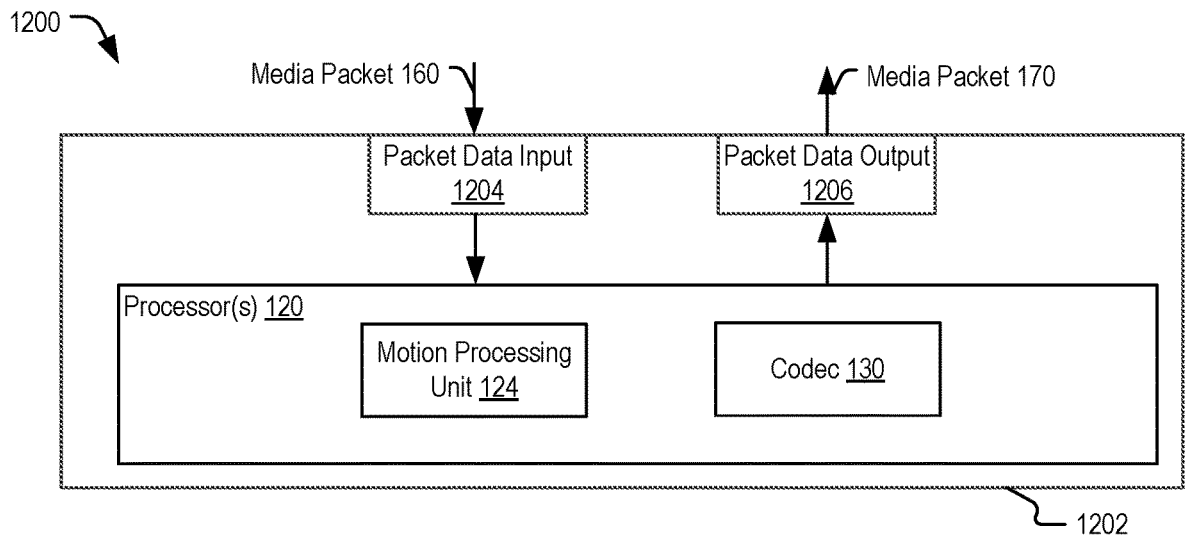
FIG. 12 illustrates an example of an integrated circuit operable to convey motion data via media packets, in accordance with some examples of the present disclosure.
Figure 16:
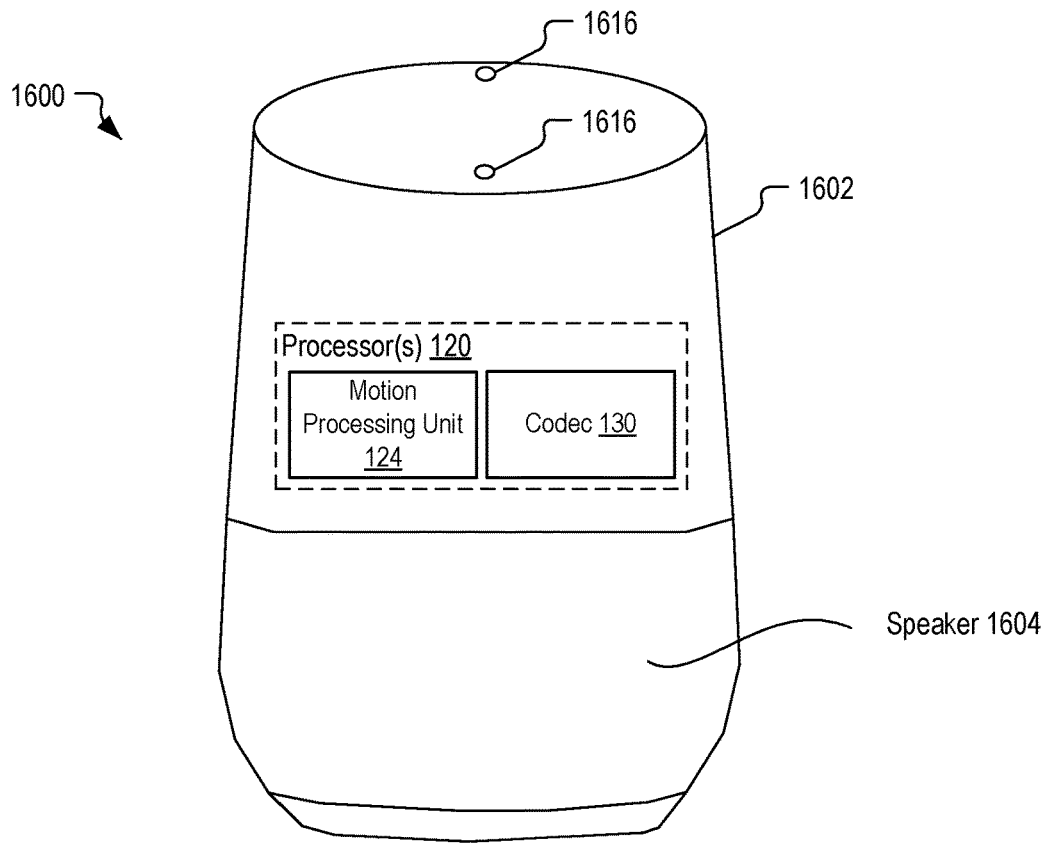
FIG. 16 is a diagram of a voice-controlled speaker system operable to convey motion data via media packets, in accordance with some examples of the present disclosure.

FIG. 12 depicts an implementation 1200 of the first device 102 as an integrated circuit 1202 that includes the one or more processors 120. The integrated circuit 1202 also includes a packet data input 1204, such as one or more bus interfaces, to enable the media packet 160 to be received for processing. The integrated circuit 1202 also includes a packet data output 1206, such as a bus interface, to enable sending of an output signal, such as the media packet 170. The integrated circuit 1202 enables implementation of audio encoding based on link data as a component in a system, such as a mobile phone or tablet as depicted in FIG. 13, a headset as depicted in FIG. 14, a smart watch device as depicted in FIG. 15, a voice-controlled speaker system as depicted in FIG. 16, a camera as depicted in FIG. 17, a virtual reality headset, mixed reality headset, or augmented reality headset as depicted in FIG. 18, or a vehicle as depicted in FIG. 19 or FIG. 20.

FIG. 13 depicts an implementation 1300 in which the first device 102 is a mobile device 1302, such as a phone or tablet computer device, as illustrative, non-limiting examples. The mobile device 1302 includes microphones 1316 and a display screen 1304. Components of the one or more processors 120, including the motion processing unit 124 and the codec 130, are integrated in the mobile device 1302 and are illustrated using dashed lines to indicate internal components that are not generally visible to a user of the mobile device 1302.

FIG. 14 depicts an implementation 1400 in which the IMU 142 and the codec 130, are integrated in a headset device 1402. The headset device 1402 includes microphones 1416 positioned to capture speech of a user and environmental sounds. In a particular example, the codec 130 is configured to include motion data from the IMU 142 and audio data from the microphones 1416 together in a media packet for transmission to a handset, to receive a media packet that includes motion data, audio data, or both, or a combination thereof.

FIG. 15 depicts an implementation 1500 in which the first device 102 is a wearable electronic device 1502, illustrated as a "smart watch." The IMU 142 and the codec 130 are integrated into the wearable electronic device 1502. The wearable electronic device 1502 includes microphones 1516 positioned to capture sounds such as speech of a user and environmental sounds and also includes a display screen 1504. In a particular example, the codec 130 is configured to include motion data from the IMU 142 and audio data from the microphones 1516 together in a media packet for transmission to a handset, to receive a media packet that includes motion data, audio data, or both, or a combination thereof.

FIG. 16 is an implementation 1600 in which the first device 102 is a wireless speaker and voice activated device 1602. The wireless speaker and voice activated device 1602 can have wireless network connectivity and is configured to execute an assistant operation. The one or more processors 120, including the motion processing unit 124 and the codec 130, and microphones 1616, or a combination thereof, are included in the wireless speaker and voice activated device 1602. The wireless speaker and voice activated device 1602 also includes a speaker 1604. During operation, in response to receiving a verbal command, the wireless speaker and voice activated device 1602 can execute assistant operations, such as via execution of an integrated assistant application at the one or more processors 120. The assistant operations can include adjusting a temperature, playing music, turning on lights, etc. For example, the assistant operations are performed responsive to receiving a command after a keyword or key phrase (e.g., "hello assistant"). In a particular example, the motion processing unit 124 is configured to include information corresponding to a pose of a user, whose voice is detected via the microphones 1616, along with audio data captured by the speakers (e.g., spatial audio data), in a media packet for transmission to a remote device, such as the remote server 706 of FIG. 7 or the remote server 806 of FIG. 8. Although the wireless speaker and voice activated device 1602 may be relatively stationary during use, user pose can be estimated via beamforming to estimate user direction and distance from the wireless speaker and voice activated device 1602, and user orientation may be estimated based on reverberation or other characteristics in conjunction with an acoustic model of the acoustic environment of the wireless speaker and voice activated device 1602.

FIG. 17 depicts an implementation 1700 in which the first device 102 is a portable electronic device that corresponds to a camera device 1702. The camera device 1702 includes the IMU 142, the codec 130, microphones 1716, or a combination thereof. In a particular example, the codec 130 is configured to include motion data from the IMU 142 and audio data from the microphones 1716 together in a media packet for transmission to a handset or other remote device, to receive a media packet that includes motion data, audio data, or both, or a combination thereof.

FIG. 18 depicts an implementation 1800 in which the first device 102 includes a portable electronic device that corresponds to an extended reality ("XR") headset 1802, such as a virtual reality ("VR"), augmented reality ("AR"), or mixed reality ("MR") headset device. The IMU 142, the motion processing unit 124, the codec 130, microphones 1816, or a combination thereof, are integrated into the headset 1802. A visual interface device 1804 is positioned in front of the user's eyes to enable display of augmented reality or virtual reality images or scenes to the user while the headset 1802 is worn. In a particular example, the headset 1802 is configured to operate as described with reference to any one or more of the second devices 404, 504, 604, 704, or 804 of FIGS. 4-8.

FIG. 19 depicts an implementation 1900 in which the first device 102 corresponds to or is integrated within a vehicle 1902, illustrated as a manned or unmanned aerial device (e.g., a package delivery drone). The IMU 142 and the codec 130, microphones 1916, or a combination thereof, are integrated into the vehicle 1902. In a particular example, the codec 130 is configured to include motion data from the IMU 142 and audio data from the microphones 1916, such as environmental sounds and spoken delivery instructions from an authorized user of the vehicle 1902, together in a media packet for transmission to a handset or other remote device, such as a remote server controlling flight operations of the vehicle 1902.

FIG. 20 depicts another implementation 2000 in which the first device 102 corresponds to, or is integrated within, a vehicle 2002, illustrated as a car. The vehicle 2002 includes the one or more processors 120 including the motion processing unit 124 and the codec 130. The vehicle 2002 also includes microphones 2016 and a display 2020. In a particular example, the codec 130 is configured to send or receive media packets that include motion data during wireless communications with a second device (e.g., a base station of a 5G wireless network, not shown, an electronic device such as a phone within a cabin of the vehicle 2002, or another vehicle that is in wireless communication with the vehicle 2002). In some implementations, the vehicle 2002 is configured to operate as one or more the second devices 404, 504, 604, 704, or 804 of FIGS. 4-8, such as when a sound system of the vehicle 2002 is playing streaming motion-compensation audio data to occupants of the vehicle 2002; to operate as one or more the first devices 402, 502, 602, 702, or 802 of FIGS. 4-8, such as when the vehicle 2002 is conveying audio data and motion data with an occupant's electronic device, such as a gaming device; to operate as one or both of the remote server 706 of FIG. 7 or 806 of FIG. 8, such as when the vehicle 2002 hosts the XR application 750 to enable XR gameplay with occupants of one or more other vehicles; or any combination thereof.

Figure 21:
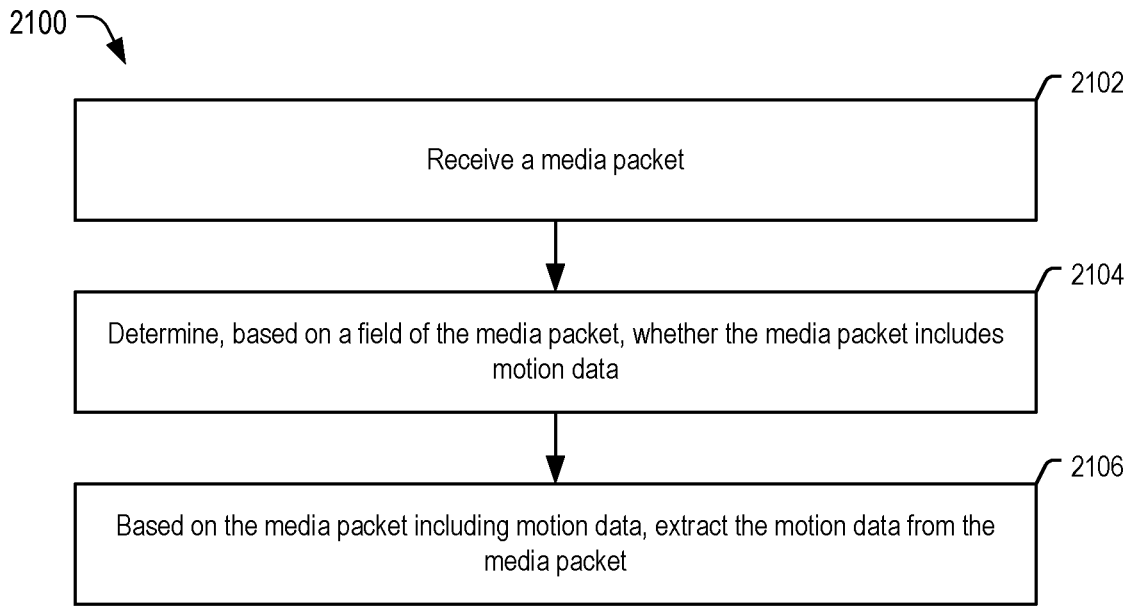
FIG. 21 illustrates an example of a method of conveying motion data via a media packet, in accordance with some examples of the present disclosure.

FIG. 21 illustrates an example of a method 2100 of conveying motion data in a media packet. The method 2100 may be performed by an electronic device, such as the first device 102 or any of the devices illustrated in FIGS. 3-8, as illustrative, non-limiting examples.

The method 2100 includes, at block 2102, receiving, at one or more processors, a media packet. For example, the one or more processors 120 of FIG. 1 receive the media packet data 129 including the media packet 160 at the codec 130.

The method 2100 includes, at block 2104, determining, at the one or more processors and based on a field of the media packet, whether the media packet includes motion data. In a particular implementation, the codec 130 (e.g., the media packet motion data extractor 134) determines whether the media packet includes motion data based on one or more flags in the media packet, such as the first flag 209 of FIG. 2, that indicates the presence or absence of the motion data in the media packet 200.

The method 2100 includes, at block 2106, based on the media packet including motion data, extracting the motion data from the media packet. In some implementations, the motion data includes motion sensor data from an inertial measurement unit of a second device, such as the motion sensor data 444 of the second device 404 of FIG. 4. In some implementations, the motion data corresponds to orientation data of a second device, such as the motion data 320 of FIG. 3 indicating the pitch 312, roll 314, and yaw 316 of the headphone device 310.

In some implementations, the media packet is processed at a link layer of a multi-layer software stack. For example, the streaming device 304 of FIG. 3 processes the media packet 200 at the link layer 264 and forwards the audio data 318 and the motion data 320 to the shared memory 340.

Receiving motion data in media packets enables the motion data to be extracted at a link layer and routed to a processing component, such as via a shared memory, reducing a delay that may otherwise be incurred by instead conveying the motion data to a host controller at an application layer. As a result, motion compensation of spatial audio can be provided with increased accuracy as compared to a system that performs application layer extraction and processing of the motion data.

Figure 22:
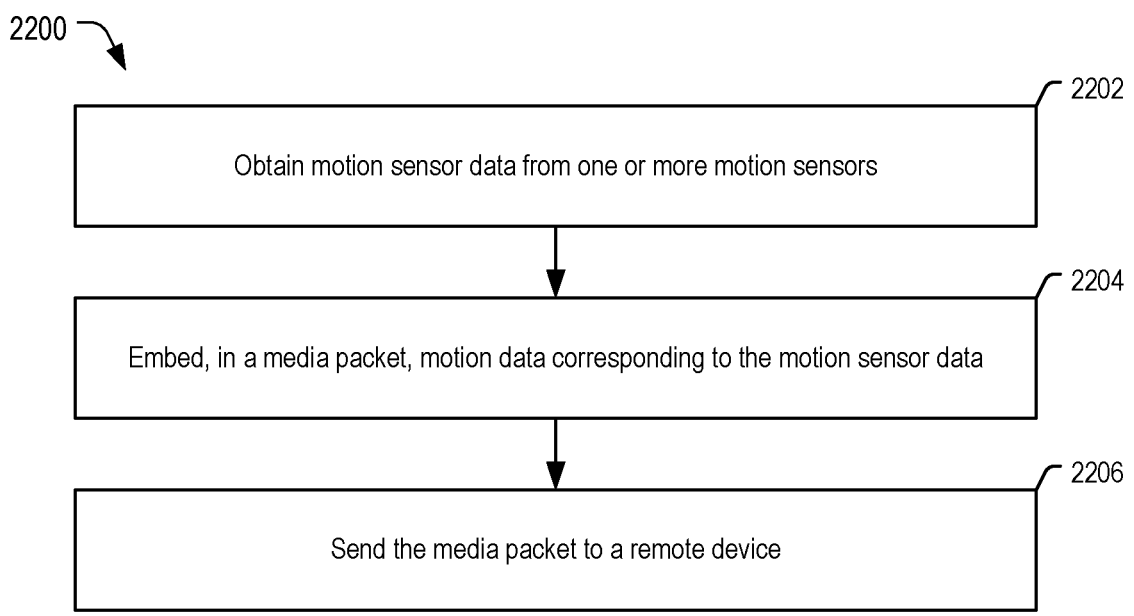
FIG. 22 illustrates another example of a method of conveying motion data via a media packet, in accordance with some examples of the present disclosure.

FIG. 22 illustrates an example of a method 2200 of audio encoding based on link data. The method 2200 may be performed by an electronic device, such as the first device 102 or any of the devices illustrated in FIGS. 3-8, as illustrative, non-limiting examples.

The method 2200 includes obtaining, at one or more processors, motion sensor data from one or more motion sensors, at block 2202. For example, the motion processing unit 124 of the one or more processors 120 of FIG. 1 receive the motion sensor data 144 from the one or more motion sensors 140.

The method 2200 includes embedding, in a media packet, motion data corresponding to the motion sensor data, at block 2204. For example, the codec 130 embeds the motion data 146 (e.g., the local device motion data 141 corresponding to the motion sensor data 144) in the media packet 170 as the motion data 176. In some implementations, the method 2200 also includes embedding audio data in the media packet. For example, the codec 130 can embed the audio data 123, the adjusted spatial audio data 150, or the binauralized audio data 152 in the media packet 170 as the audio data 178.

In some implementations, the method 2200 also includes sending the media packet to a remote device, at block 2206. For example, the codec 130 sends media packet data 129 including the media packet 170, to the modem 132 for transmission to the second device 192 via the network 190.

Sending motion data in media packets enables a receiving device to extract and process the motion data at a link layer, reducing a delay that may otherwise be incurred by instead conveying the motion data to a host controller at an application layer. As a result, motion compensation of spatial audio can be provided with increased accuracy as compared to a system that performs application layer extraction and processing of the motion data.

Figure 23:
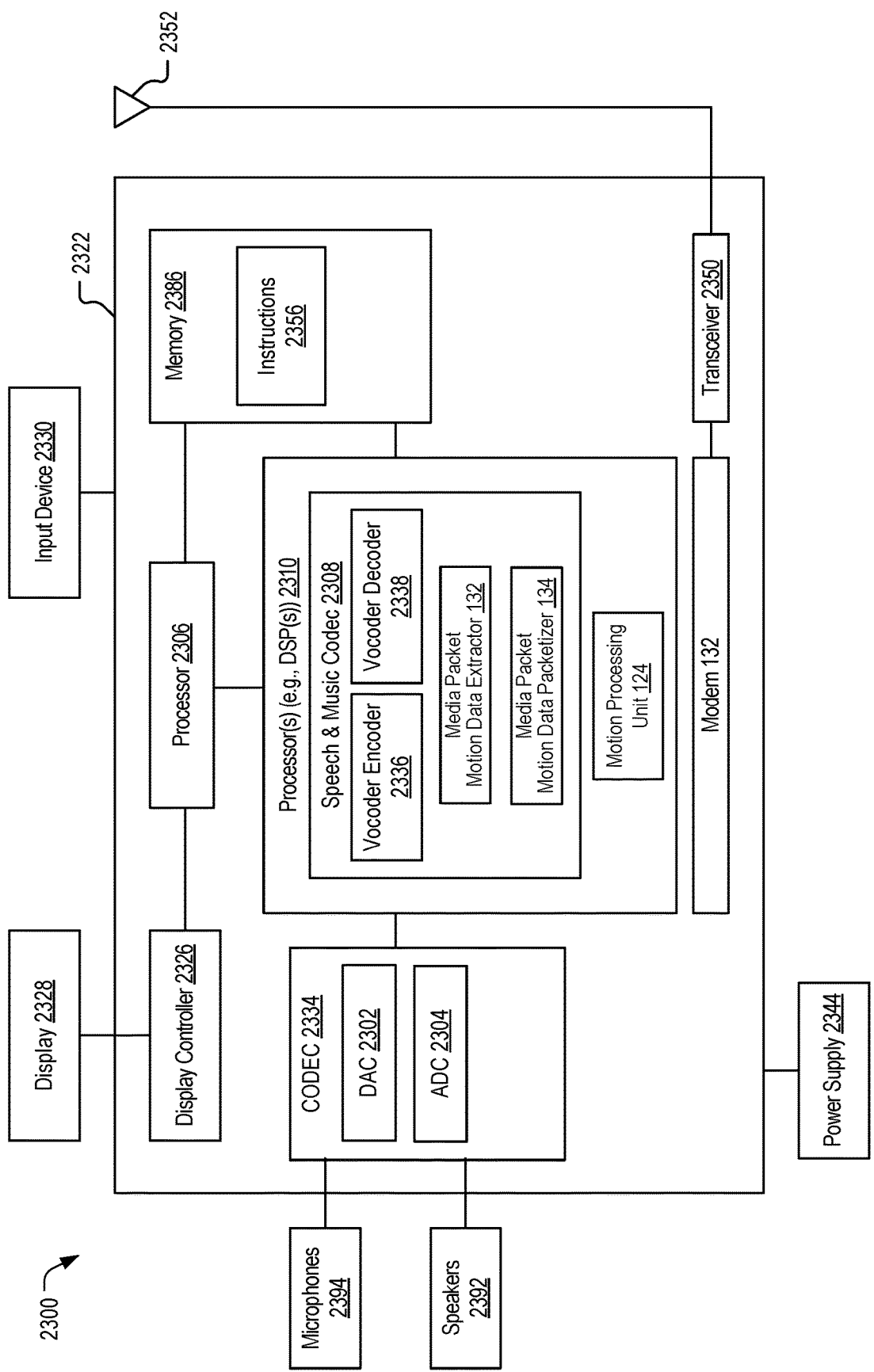
FIG. 23 is a block diagram of a particular illustrative example of a computing device that is operable to perform the techniques described with reference to FIGS. 1-22.

Referring to FIG. 23, a block diagram of a particular illustrative implementation of a device is depicted and generally designated 2300. In various implementations, the device 2300 may have more or fewer components than illustrated in FIG. 23. In an illustrative implementation, the device 2300 may correspond to the first device 102. In an illustrative implementation, the device 2300 may perform one or more operations described with reference to FIGS. 1-22.

In a particular implementation, the device 2300 includes a processor 2306 (e.g., a central processing unit (CPU)). The device 2300 may include one or more additional processors 2310 (e.g., one or more DSPs). In a particular implementation, the processor 120 of FIG. 2 corresponds to the processor 2306, the processors 2310, or a combination thereof. For example, the processors 2310 may include the motion processing unit 124 and a speech and music coder-decoder (CODEC) 2308 that includes a voice coder ("vocoder") encoder 2336, a vocoder decoder 2338, the media packet motion data extractor 134, the media packet motion data packetizer 136, or a combination thereof.

The device 2300 may include a memory 2386 and a CODEC 2334. The memory 2386 may include instructions 2356 that are executable by the one or more additional processors 2310 (or the processor 2306) to implement the functionality described with reference to the motion processing unit 124, the media packet motion data extractor 134, the media packet motion data packetizer 136, or any combination thereof. The device 2300 may include the modem 132 coupled, via a transceiver 2350, to an antenna 2352.

The device 2300 may include a display 2328 coupled to a display controller 2326. One or more speakers 2392 and one or more microphones 2394 may be coupled to the CODEC 2334. The CODEC 2334 may include a digital-to-analog converter (DAC) 2302 and an analog-to-digital converter (ADC) 2304. In a particular implementation, the CODEC 2334 may receive analog signals from the microphone 2394, convert the analog signals to digital signals using the analog-to-digital converter 2304, and send the digital signals to the speech and music codec 2308. In a particular implementation, the speech and music codec 2308 may provide digital signals to the CODEC 2334. The CODEC 2334 may convert the digital signals to analog signals using the digital-to-analog converter 2302 and may provide the analog signals to the speakers 2392.

In a particular implementation, the device 2300 may be included in a system-in-package or system-on-chip device 2322. In a particular implementation, the memory 2386, the processor 2306, the processors 2310, the display controller 2326, the CODEC 2334, and the modem 132 are included in a system-in-package or system-on-chip device 2322. In a particular implementation, an input device 2330 and a power supply 2344 are coupled to the system-on-chip device 2322. Moreover, in a particular implementation, as illustrated in FIG. 23, the display 2328, the input device 2330, the speakers 2392, the microphones 2394, the antenna 2352, and the power supply 2344 are external to the system-on-chip device 2322. In a particular implementation, each of the display 2328, the input device 2330, the speakers 2392, the microphones 2394, the antenna 2352, and the power supply 2344 may be coupled to a component of the system-on-chip device 2322, such as an interface or a controller.

The device 2300 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, a first apparatus includes means for receiving a media packet, such as the modem 132. For example, the means for receiving the media packet can include the one or more processors 120, the codec 130, the media packet motion data extractor 134, the codec 430, the flag extractor 922, the integrated circuit 1202, the antenna 2352, the transceiver 2350, the processor 2306, the one or more processors 2310, the speech and music codec 2308, or any combination thereof.

The first apparatus includes means for determining, based on a field of the media packet, whether the media packet includes motion data. For example, the means for determining whether the media packet includes motion data can include the one or more processors 120, the codec 130, the media packet motion data extractor 134, the codec 430, the flag extractor 922, the flag comparator 924, the integrated circuit 1202, the processor 2306, the one or more processors 2310, the speech and music codec 2308, or any combination thereof.

The first apparatus includes means for extracting the motion data from the media packet based on the media packet including motion data. For example, the means for extracting the motion data from the media packet can include the one or more processors 120, the codec 130, the media packet motion data extractor 134, the codec 430, the motion data extractor 928, the integrated circuit 1202, the processor 2306, the one or more processors 2310, the speech and music codec 2308, or any combination thereof.

In conjunction with the described techniques, a second apparatus includes means for obtaining motion sensor data from one or more motion sensors. For example, the means for obtaining motion sensor data from one or more motion sensors can include the one or more processors 120, the motion processing unit 124, the codec 130, the media packet motion data packetizer 136, the codec 430, the flag generator 932, the integrated circuit 1202, the processor 2306, the one or more processors 2310, the speech and music codec 2308, or any combination thereof.

The second apparatus includes means for embedding, in a media packet, motion data corresponding to the motion sensor data. For example, the means for embedding motion data corresponding to the motion sensor data can include the one or more processors 120, the codec 130, the media packet motion data packetizer 136, the codec 430, the flag generator 932, the motion data packer 936, the integrated circuit 1202, the processor 2306, the one or more processors 2310, the speech and music codec 2308, or any combination thereof.

In conjunction with the described techniques, a third apparatus includes means for receiving a media packet that includes motion data. For example, the means for receiving a media packet can include the one or more processors 120, the codec 130, the media packet motion data extractor 134, the codec 430, the flag extractor 922, the integrated circuit 1202, the antenna 2352, the transceiver 2350, the processor 2306, the one or more processors 2310, the speech and music codec 2308, or any combination thereof.

The third apparatus includes means for extracting the motion data from the media packet. For example, the means for extracting the motion data from the media packet can include the one or more processors 120, the codec 130, the media packet motion data extractor 134, the codec 430, the flag extractor 922, the flag comparator 924, the motion data extractor 928, the integrated circuit 1202, the processor 2306, the one or more processors 2310, the speech and music codec 2308, or any combination thereof.

In conjunction with the described techniques, a fourth apparatus includes means for obtaining motion sensor data. For example, the means for obtaining motion sensor data can include the one or more sensors 140, the IMU 142, the one or more processors 120, the motion processing unit 124, the codec 130, the media packet motion data packetizer 136, the IMU 332, the codec 430, the one or more sensors 440, the flag generator 932, the integrated circuit 1202, the processor 2306, the one or more processors 2310, the speech and music codec 2308, or any combination thereof.

The fourth apparatus includes means for embedding, in a media packet, motion data corresponding to the motion sensor data. For example, the means for embedding the motion data can include the one or more processors 120, the codec 130, the media packet motion data packetizer 136, the codec 430, the flag generator 932, the motion data packer 936, the integrated circuit 1202, the processor 2306, the one or more processors 2310, the speech and music codec 2308, or any combination thereof.

The fourth apparatus includes means for inserting, into the media packet, an indication that the media packet includes the motion data. For example, the means for inserting the indication can include the one or more processors 120, the codec 130, the media packet motion data packetizer 136, the codec 430, the flag generator 932, the motion data packer 936, the integrated circuit 1202, the processor 2306, the one or more processors 2310, the speech and music codec 2308, or any combination thereof.

In some implementations, a non-transitory computer-readable medium (e.g., a computer-readable storage device, such as the memory 110 or the memory 2386) includes instructions (e.g., the instructions 112 or the instructions 2356) that, when executed by one or more processors (e.g., the one or more processors 120, the processor 2306, or the one or more processors 2310), cause the one or more processors to perform operations corresponding to at least a portion of any of the techniques or methods described with reference to FIGS. 1-23 or any combination thereof.

Particular aspects of the disclosure are described below in sets of interrelated clauses:

According to Clause 1, a device includes: a memory configured to store instructions; and one or more processors configured to execute the instructions to: receive a media packet; determine, based on a field of the media packet, whether the media packet includes motion data; and based on the media packet including motion data, extract the motion data from the media packet.

Clause 2 includes the device of Clause 1, wherein the media packet includes a header and a payload, and wherein the field is in the header.

Clause 3 includes the device of Clause 2, wherein the field includes a flag to indicate the presence or absence of the motion data in the payload.

Clause 4 includes the device of Clause 3, wherein the flag further indicates the presence or absence of media data in the payload.

Clause 5 includes the device of any of Clause 1 to Clause 4, wherein the media packet is processed at a link layer of a multi-layer software stack.

Clause 6 includes the device of any of Clause 1 to Clause 5, wherein the one or more processors are further configured to: extract audio data from the media packet; and provide the audio data and the motion data to a shared memory coupled to the one or more processors.

Clause 7 includes the device of any of Clause 1 to Clause 6, wherein the motion data corresponds to motion of a wearable device, and wherein the one or more processors are further configured to estimate an orientation of the wearable device based on the motion data.

Clause 8 includes the device of Clause 7, wherein the one or more processors are integrated into a handset and are configured to estimate the orientation further based on motion sensor data from a motion sensor of the handset.

Clause 9 includes the device of Clause 7 or Clause 8, wherein the one or more processors are further configured to generate binauralized audio data for transmission to the wearable device.

Clause 10 includes the device of any of Clause 7 to Clause 9, wherein the one or more processors are further configured to send, to an extended reality application at a remote device, orientation data indicating the orientation of the wearable device.

Clause 11 includes the device of any of Clause 1 to Clause 6, wherein the one or more processors are integrated into a wearable device that includes a motion sensor and speakers, wherein the motion data corresponds to motion of a handset, and wherein the one or more processors are further configured to: estimate an orientation of the wearable device based on the motion data of the handset and further based on motion sensor data from the motion sensor; and based on the estimated orientation, generate binauralized audio data for playback via the speakers.

Clause 12 includes the device of any of Clause 1 to Clause 11, wherein the motion data includes motion sensor data from an inertial measurement unit of a second device.

Clause 13 includes the device of any of Clause 1 to Clause 11, wherein the motion data corresponds to orientation data of a second device.

Clause 14 includes the device of any of Clause 1 to Clause 7, wherein the one or more processors are integrated in at least one of a mobile phone, a tablet computer device, or a camera device.

Clause 15 includes the device of any of Clause 1 to Clause 7, wherein the one or more processors are integrated in a mobile phone.

Clause 16 includes the device of any of Clause 1 to Clause 7, wherein the one or more processors are integrated a tablet computer device.

Clause 17 includes the device of any of Clause 1 to Clause 7, wherein the one or more processors are integrated in a camera device.

Clause 18 includes the device of any of Clause 1 to Clause 6, wherein the one or more processors are integrated in a wearable device.

Clause 19 includes the device of Clause 18, wherein the wearable device includes a headphone device.

Clause 20 includes the device of Clause 18, wherein the wearable device includes a smart watch device.

Clause 21 includes the device of Clause 18, wherein the wearable device includes at least one of a virtual reality headset, a mixed reality headset, or an augmented reality headset.

Clause 22 includes the device of any of Clause 1 to Clause 6, wherein the one or more processors are integrated in a headphone device.

Clause 23 includes the device of any of Clause 1 to Clause 6, wherein the one or more processors are integrated in a smart watch device.

Clause 24 includes the device of any of Clause 1 to Clause 6, wherein the one or more processors are integrated in at least one of a virtual reality headset, a mixed reality headset, or an augmented reality headset.

Clause 25 includes the device of any of Clause 1 to Clause 6, wherein the one or more processors are integrated in a virtual reality headset.

Clause 26 includes the device of any of Clause 1 to Clause 6, wherein the one or more processors are integrated in a mixed reality headset.

Clause 27 includes the device of any of Clause 1 to Clause 6, wherein the one or more processors are integrated in an augmented reality headset.

Clause 28 includes the device of any of Clause 1 to Clause 6, wherein the one or more processors are integrated in a vehicle.

According to Clause 29, a method includes: receiving, at one or more processors, a media packet; determining, at the one or more processors and based on a field of the media packet, whether the media packet includes motion data; and based on the media packet including motion data, extracting the motion data from the media packet.

Clause 30 includes the method of Clause 29, wherein the media packet includes a header and a payload, and wherein the field is in the header.

Clause 31 includes the method of Clause 30, wherein the field includes a flag to indicate the presence or absence of the motion data in the payload.

Clause 32 includes the method of Clause 31, wherein the flag further indicates the presence or absence of media data in the payload.

Clause 33 includes the method of any of Clause 29 to Clause 32, wherein the media packet is processed at a link layer of a multi-layer software stack.

Clause 34 includes the method of any of Clause 29 to Clause 33, further including: extracting audio data from the media packet; and providing the audio data and the motion data to a shared memory coupled to the one or more processors.

Clause 35 includes the method of any of Clause 29 to Clause 34, wherein the motion data corresponds to motion of a wearable device, and further including estimating an orientation of the wearable device based on the motion data.

Clause 36 includes the method of Clause 35, further including estimating the orientation further based on motion sensor data from a motion sensor of a handset that includes the one or more processors.

Clause 37 includes the method of Clause 35 or Clause 36, further including generating binauralized audio data for transmission to the wearable device.

Clause 38 includes the method of any of Clause 35 to Clause 37, further including sending, to an extended reality application at a remote device, orientation data indicating the orientation of the wearable device.

Clause 39 includes the method of any of Clause 29 to Clause 34, wherein the motion data corresponds to motion of a handset, and further including: estimating an orientation of a wearable device based on the motion data of the handset and further based on motion sensor data from a motion sensor of a wearable device; and generating, based on the estimated orientation, binauralized audio data for playback via speakers of the wearable device.

Clause 40 includes the method of any of Clause 29 to Clause 34, wherein the motion data includes motion sensor data from an inertial measurement unit of a second device.

Clause 41 includes the method of any of Clause 29 to Clause 34, wherein the motion data corresponds to orientation data of a second device.

Clause 42 includes the method of any of Clause 29 to Clause 41, further including: determining whether the media packet includes audio data; and based on the media packet including audio data, extracting the audio data from the media packet.

Clause 43 includes the method of any of Clause 29 to Clause 34, wherein receiving the media packet. determining whether the media packet includes motion data, and extracting the motion data from the media packet are performed in at least one of a mobile phone, a tablet computer device, or a camera device.

Clause 44 includes the method of any of Clause 29 to Clause 34, wherein receiving the media packet. determining whether the media packet includes motion data, and extracting the motion data from the media packet are performed in a mobile phone.

Clause 45 includes the method of any of Clause 29 to Clause 34, wherein receiving the media packet. determining whether the media packet includes motion data, and extracting the motion data from the media packet are performed in a tablet computer device.

Clause 46 includes the method of any of Clause 29 to Clause 34, wherein receiving the media packet. determining whether the media packet includes motion data, and extracting the motion data from the media packet are performed in a camera device.

Clause 47 includes the method of any of Clause 29 to Clause 34, wherein receiving the media packet. determining whether the media packet includes motion data, and extracting the motion data from the media packet are performed in a wearable device.

Clause 48 includes the method of Clause 47, wherein the wearable device includes a headphone device.

Clause 49 includes the method of Clause 47, wherein the wearable device includes a smart watch device.

Clause 50 includes the method of Clause 47, wherein the wearable device includes at least one of a virtual reality headset, a mixed reality headset, or an augmented reality headset.

Clause 51 includes the method of any of Clause 29 to Clause 34, wherein receiving the media packet. determining whether the media packet includes motion data, and extracting the motion data from the media packet are performed in at least one of a virtual reality headset, a mixed reality headset, or an augmented reality headset.

Clause 52 includes the method of any of Clause 29 to Clause 34, wherein receiving the media packet, determining whether the media packet includes motion data, and extracting the motion data from the media packet are performed in a vehicle.

According to Clause 53, a device includes: a memory configured to store instructions; and one or more processors coupled to the memory and configured to execute the instructions to perform the method of Clause 29.

According to Clause 54, an apparatus includes: means for performing the method of Clause 29.

According to Clause 55, a non-transitory computer-readable medium includes instructions that, when executed by one or more processors, cause the one or more processors to perform the method of Clause 29.

According to Clause 56, an apparatus includes: means for receiving a media packet; means for determining, based on a field of the media packet, whether the media packet includes motion data; and means for extracting the motion data from the media packet based on the media packet including motion data.

According to Clause 57, a non-transitory computer-readable medium includes instructions that, when executed by one or more processors, cause the one or more processors to: receive a media packet; determine, based on a field of the media packet, whether the media packet includes motion data; and extract the motion data from the media packet based on the media packet including motion data.

According to Clause 58, a device includes: a memory configured to store instructions; and one or more processors configured to execute the instructions to: obtain motion sensor data from one or more motion sensors; and embed, in a media packet, motion data corresponding to the motion sensor data.

Clause 59 includes the device of Clause 58, further including a modem coupled to the one or more processors and configured to send the media packet to a remote device.

Clause 60 includes the device of Clause 58 or Clause 59, wherein the motion data includes the motion sensor data.

Clause 61 includes the device of any of Clause 58 to Clause 60, wherein the one or more processors are configured to generate orientation data based on the motion sensor data, and wherein the motion data includes the orientation data.

Clause 62 includes the device of any of Clause 58 to Clause 61, wherein the media packet includes a header and a payload, wherein the motion data is embedded in the payload of the media packet, and wherein the one or more processors are further configured to insert, into a field in the header of the media packet, an indication that the media packet includes the motion data.

Clause 63 includes the device of any of Clause 58 to Clause 62, wherein the one or more processors are further configured to initiate transmission of the media packet in an isochronous channel.

Clause 64 includes the device of Clause 63, wherein the isochronous channel is a Bluetooth Low Energy channel.

Clause 65 includes the device of any of Clause 58 to Clause 64, wherein the media packet is aligned with an audio frame boundary.

Clause 66 includes the device of any of Clause 58 to Clause 65, wherein the one or more processors are configured to embed audio data in the media packet.

Clause 67 includes the device of Clause 66, wherein the one or more processors are configured to insert, into a field in a header of the media packet, an indication that the media packet includes the audio data.

Clause 68 includes the device of any of Clause 58 to Clause 67, wherein the one or more processors are integrated in at least one of a mobile phone, a tablet computer device, or a camera device.

Clause 69 includes the device of any of Clause 58 to Clause 67, wherein the one or more processors are integrated in a mobile phone.

Clause 70 includes the device of any of Clause 58 to Clause 67, wherein the one or more processors are integrated a tablet computer device.

Clause 71 includes the device of any of Clause 58 to Clause 67, wherein the one or more processors are integrated in a camera device.

Clause 72 includes the device of any of Clause 58 to Clause 67, wherein the one or more processors are integrated in a wearable device.

Clause 73 includes the device of Clause 72, wherein the wearable device includes a headphone device.

Clause 74 includes the device of Clause 72, wherein the wearable device includes a smart watch device.

Clause 75 includes the device of Clause 72, wherein the wearable device includes at least one of a virtual reality headset, a mixed reality headset, or an augmented reality headset.

Clause 76 includes the device of any of Clause 58 to Clause 67, wherein the one or more processors are integrated in a headphone device.

Clause 77 includes the device of any of Clause 58 to Clause 67, wherein the one or more processors are integrated in a smart watch device.

Clause 78 includes the device of any of Clause 58 to Clause 67, wherein the one or more processors are integrated in at least one of a virtual reality headset, a mixed reality headset, or an augmented reality headset.

Clause 79 includes the device of any of Clause 58 to Clause 67, wherein the one or more processors are integrated in a virtual reality headset.

Clause 80 includes the device of any of Clause 58 to Clause 67, wherein the one or more processors are integrated in a mixed reality headset.

Clause 81 includes the device of any of Clause 58 to Clause 67, wherein the one or more processors are integrated in an augmented reality headset.

Clause 82 includes the device of any of Clause 58 to Clause 67, wherein the one or more processors are integrated in a vehicle.

According to Clause 83, a method includes: obtaining, at one or more processors, motion sensor data from one or more motion sensors; and embedding, in a media packet, motion data corresponding to the motion sensor data.

Clause 84 includes the method of Clause 83, further including sending the media packet to a remote device.

Clause 85 includes the method of Clause 83 or Clause 84, wherein the motion data includes the motion sensor data.

Clause 86 includes the method of any of Clause 83 to Clause 85, further including generating orientation data based on the motion sensor data, and wherein the motion data includes the orientation data.

Clause 87 includes the method of any of Clause 83 to Clause 86, wherein the media packet includes a header and a payload, wherein the motion data is embedded in the payload of the media packet, and further including inserting, into a field in the header of the media packet, an indication that the media packet includes the motion data.

Clause 88 includes the method of any of Clause 83 to Clause 87, further including initiating transmission of the media packet in an isochronous channel.

Clause 89 includes the method of Clause 88, wherein the isochronous channel is a Bluetooth Low Energy channel.

Clause 90 includes the method of any of Clause 83 to Clause 89, wherein the media packet is aligned with an audio frame boundary.

Clause 91 includes the method of any of Clause 83 to Clause 90, wherein further including embedding audio data in the media packet.

Clause 92 includes the method of Clause 91, further including inserting, into a field in a header of the media packet, an indication that the media packet includes the audio data.

Clause 93 includes the method of any of Clause 83 to Clause 92, wherein obtaining the motion sensor data and embedding the motion data are performed in at least one of a mobile phone, a tablet computer device, or a camera device.

Clause 94 includes the method of any of Clause 83 to Clause 92, wherein obtaining the motion sensor data and embedding the motion data are performed in a mobile phone.

Clause 95 includes the method of any of Clause 83 to Clause 92, wherein obtaining the motion sensor data and embedding the motion data are performed in a tablet computer device.

Clause 96 includes the method of any of Clause 83 to Clause 92, wherein obtaining the motion sensor data and embedding the motion data are performed in a camera device.

Clause 97 includes the method of any of Clause 83 to Clause 92, wherein obtaining the motion sensor data and embedding the motion data are performed in a wearable device.

Clause 98 includes the method of Clause 97, wherein the wearable device includes a headphone device.

Clause 99 includes the method of Clause 97, wherein the wearable device includes a smart watch device.

Clause 100 includes the method of Clause 97, wherein the wearable device includes at least one of a virtual reality headset, a mixed reality headset, or an augmented reality headset.

Clause 101 includes the method of any of Clause 83 to Clause 92, wherein obtaining the motion sensor data and embedding the motion data are performed in at least one of a virtual reality headset, a mixed reality headset, or an augmented reality headset.

Clause 102 includes the method of any of Clause 83 to Clause 92, wherein obtaining the motion sensor data and embedding the motion data are performed in a vehicle.

According to Clause 103, a device includes: a memory configured to store instructions; and one or more processors coupled to the memory and configured to execute the instructions to perform the method of Clause 83.

According to Clause 104, an apparatus includes: means for performing the method of Clause 83.

According to Clause 105, a non-transitory computer-readable medium includes instructions that, when executed by one or more processors, cause the one or more processors to perform the method of Clause 83.

According to Clause 106, an apparatus includes: means for obtaining motion sensor data from one or more motion sensors; and means for embedding, in a media packet, motion data corresponding to the motion sensor data.

According to Clause 107, a non-transitory computer-readable medium includes instructions that, when executed by one or more processors, cause the one or more processors to: obtain motion sensor data from one or more motion sensors; and embed, in a media packet, motion data corresponding to the motion sensor data.

According to Clause 108, a device includes: a memory configured to store instructions; and one or more processors configured to execute the instructions to: receive a media packet that includes motion data; and extract the motion data from the media packet.

Clause 109 includes the device of Clause 108, wherein the one or more processors are further configured to determine, based on a field of the media packet, whether the media packet includes the motion data.

Clause 110 includes the device of Clause 109, wherein the media packet includes a header and a payload, and wherein the field is in the header.

Clause 111 includes the device of Clause 110, wherein the field includes a flag to indicate the presence or absence of the motion data in the payload.

Clause 112 includes the device of Clause 111, wherein the flag further indicates the presence or absence of media data in the payload.

Clause 113 includes the device of any of Clause 108 to Clause 112, wherein the media packet is processed at a link layer of a multi-layer software stack.

Clause 114 includes the device of any of Clause 108 to Clause 113, wherein the one or more processors are further configured to: extract audio data from the media packet; and provide the audio data and the motion data to a shared memory coupled to the one or more processors.

Clause 115 includes the device of any of Clause 108 to Clause 114, wherein the motion data corresponds to motion of a wearable device, and wherein the one or more processors are further configured to estimate an orientation of the wearable device based on the motion data.

Clause 116 includes the device of Clause 115, wherein the one or more processors are integrated into a handset and are configured to estimate the orientation further based on motion sensor data from a motion sensor of the handset.

Clause 117 includes the device of Clause 115 or Clause 116, wherein the one or more processors are further configured to generate binauralized audio data for transmission to the wearable device.

Clause 118 includes the device of any of Clause 115 to Clause 117, wherein the one or more processors are further configured to send, to an extended reality application at a remote device, orientation data indicating the orientation of the wearable device.

Clause 119 includes the device of any of Clause 108 to Clause 114, wherein the one or more processors are integrated into a wearable device that includes a motion sensor and speakers, wherein the motion data corresponds to motion of a handset, and wherein the one or more processors are further configured to: estimate an orientation of the wearable device based on the motion data of the handset and further based on motion sensor data from the motion sensor; and based on the estimated orientation, generate binauralized audio data for playback via the speakers.

Clause 120 includes the device of any of Clause 108 to Clause 119, wherein the motion data includes motion sensor data from an inertial measurement unit of a second device.

Clause 121 includes the device of any of Clause 108 to Clause 119, wherein the motion data corresponds to orientation data of a second device.

According to Clause 122, a method includes: receiving, at one or more processors, a media packet that includes motion data; and extracting the motion data from the media packet.

Clause 123 includes the method of Clause 122, further including determining, based on a field of the media packet, whether the media packet includes the motion data.

Clause 124 includes the method of Clause 123, wherein the media packet includes a header and a payload, and wherein the field is in the header.

Clause 125 includes the method of Clause 124, wherein the field includes a flag to indicate the presence or absence of the motion data in the payload.

Clause 126 includes the method of Clause 125, wherein the flag further indicates the presence or absence of media data in the payload.

Clause 127 includes the method of any of Clause 122 to Clause 126, wherein the media packet is processed at a link layer of a multi-layer software stack.

Clause 128 includes the method of any of Clause 122 to Clause 127, further including: extracting audio data from the media packet; and providing the audio data and the motion data to a shared memory coupled to the one or more processors.

Clause 129 includes the method of any of Clause 122 to Clause 128, wherein the motion data corresponds to motion of a wearable device, and further including estimating an orientation of the wearable device based on the motion data.

Clause 130 includes the method of Clause 129, further including estimating the orientation further based on motion sensor data from a motion sensor of a handset that includes the one or more processors.

Clause 131 includes the method of Clause 129 or Clause 130, further including generating binauralized audio data for transmission to the wearable device.

Clause 132 includes the method of any of Clause 129 to Clause 131, further including sending, to an extended reality application at a remote device, orientation data indicating the orientation of the wearable device.

Clause 133 includes the method of any of Clause 122 to Clause 128, wherein the motion data corresponds to motion of a handset, and further including: estimating an orientation of a wearable device based on the motion data of the handset and further based on motion sensor data from a motion sensor of a wearable device; and generating, based on the estimated orientation, binauralized audio data for playback via speakers of the wearable device.

Clause 134 includes the method of any of Clause 122 to Clause 128, wherein the motion data includes motion sensor data from an inertial measurement unit of a second device.

Clause 135 includes the method of any of Clause 122 to Clause 128, wherein the motion data corresponds to orientation data of a second device.

Clause 136 includes the method of any of Clause 122 to Clause 128, further including: determining whether the media packet includes audio data; and based on the media packet including audio data, extracting the audio data from the media packet.

Clause 137 includes the method of any of Clause 122 to Clause 128, wherein receiving the media packet. determining whether the media packet includes motion data, and extracting the motion data from the media packet are performed in at least one of a mobile phone, a tablet computer device, or a camera device.

Clause 138 includes the method of any of Clause 122 to Clause 128, wherein receiving the media packet. determining whether the media packet includes motion data, and extracting the motion data from the media packet are performed in a mobile phone.

Clause 139 includes the method of any of Clause 122 to Clause 128, wherein receiving the media packet. determining whether the media packet includes motion data, and extracting the motion data from the media packet are performed in a tablet computer device.

Clause 140 includes the method of any of Clause 122 to Clause 128, wherein receiving the media packet. determining whether the media packet includes motion data, and extracting the motion data from the media packet are performed in a camera device.

Clause 141 includes the method of any of Clause 122 to Clause 128, wherein receiving the media packet. determining whether the media packet includes motion data, and extracting the motion data from the media packet are performed in a wearable device.

Clause 142 includes the method of Clause 141, wherein the wearable device includes a headphone device.

Clause 143 includes the method of Clause 141, wherein the wearable device includes a smart watch device.

Clause 144 includes the method of Clause 141, wherein the wearable device includes at least one of a virtual reality headset, a mixed reality headset, or an augmented reality headset.

Clause 145 includes the method of any of Clause 122 to Clause 128, wherein receiving the media packet. determining whether the media packet includes motion data, and extracting the motion data from the media packet are performed in at least one of a virtual reality headset, a mixed reality headset, or an augmented reality headset.

Clause 146 includes the method of any of Clause 122 to Clause 128, wherein receiving the media packet. determining whether the media packet includes motion data, and extracting the motion data from the media packet are performed in a vehicle.

According to Clause 147, a device includes: a memory configured to store instructions; and one or more processors coupled to the memory and configured to execute the instructions to perform the method of Clause 122.

According to Clause 148, an apparatus includes: means for performing the method of Clause 122.

According to Clause 149, a non-transitory computer-readable medium includes instructions that, when executed by one or more processors, cause the one or more processors to perform the method of Clause 122.

According to Clause 150, an apparatus includes: means for receiving a media packet that includes motion data; and means for extracting the motion data from the media packet.

According to Clause 151, a non-transitory computer-readable medium includes instructions that, when executed by one or more processors, cause the one or more processors to: receive a media packet that includes motion data; and extract the motion data from the media packet.

According to Clause 152, a device includes: a memory configured to store instructions; and one or more processors configured to execute the instructions to: obtain motion sensor data from one or more motion sensors; embed, in a media packet, motion data corresponding to the motion sensor data; and insert, into the media packet, an indication that the media packet includes the motion data.

Clause 153 includes the device of Clause 152, further including a modem coupled to the one or more processors and configured to send the media packet to a remote device.

Clause 154 includes the device of Clause 152 or Clause 153, wherein the motion data includes the motion sensor data.

Clause 155 includes the device of any of Clause 152 to 154, wherein the one or more processors are configured to generate orientation data based on the motion sensor data, and wherein the motion data includes the orientation data.

Clause 156 includes the device of any of Clause 152 to 155, wherein the media packet includes a header and a payload, wherein the motion data is embedded in the payload of the media packet, and wherein the indication is inserted into a field in the header of the media packet.

Clause 157 includes the device of any of Clause 152 to 156, wherein the one or more processors are further configured to initiate transmission of the media packet in an isochronous channel.

Clause 158 includes the device of Clause 157, wherein the isochronous channel is a Bluetooth Low Energy channel.

Clause 159 includes the device of any of Clause 152 to 158, wherein the media packet is aligned with an audio frame boundary.

Clause 160 includes the device of any of Clause 152 to 159, wherein the one or more processors are further configured to embed audio data in the media packet.

Clause 161 includes the device of Clause 160, wherein the one or more processors are further configured to insert, into a field in a header of the media packet, an indication that the media packet includes the audio data.

According to Clause 162, a method includes: obtaining, at one or more processors, motion sensor data; embedding, in a media packet, motion data corresponding to the motion sensor data; and inserting, into the media packet, an indication that the media packet includes the motion data.

Clause 163 includes the method of Clause 162, further including sending the media packet to a remote device.

Clause 164 includes the method of Clause 162 or Clause 163, wherein the motion data includes the motion sensor data.

Clause 165 includes the method of any of Clause 162 to Clause 164, further including generating orientation data based on the motion sensor data, and wherein the motion data includes the orientation data.

Clause 166 includes the method of any of Clause 162 to Clause 165, wherein the media packet includes a header and a payload, wherein the motion data is embedded in the payload of the media packet, and wherein the indication is inserted into a field in the header of the media packet.

Clause 167 includes the method of any of Clause 162 to Clause 166, further including initiating transmission of the media packet in an isochronous channel.

Clause 168 includes the method of Clause 167, wherein the isochronous channel is a Bluetooth Low Energy channel.

Clause 169 includes the method of any of Clause 162 to Clause 168, wherein the media packet is aligned with an audio frame boundary.

Clause 170 includes the method of any of Clause 162 to Clause 168, further including embedding audio data in the media packet.

Clause 171 includes the method of Clause 170, further including inserting, into a field in a header of the media packet, an indication that the media packet includes the audio data.

Clause 172 includes the method of any of Clause 162 to Clause 170, wherein obtaining the motion sensor data, embedding the motion data, and inserting the indication are performed in at least one of a mobile phone, a tablet computer device, or a camera device.

Clause 173 includes the method of any of Clause 162 to Clause 170, wherein obtaining the motion sensor data, embedding the motion data, and inserting the indication are performed in a mobile phone.

Clause 174 includes the method of any of Clause 162 to Clause 170, wherein obtaining the motion sensor data, embedding the motion data, and inserting the indication are performed in a tablet computer device.

Clause 175 includes the method of any of Clause 162 to Clause 170, wherein obtaining the motion sensor data, embedding the motion data, and inserting the indication are performed in a camera device.

Clause 176 includes the method of any of Clause 162 to Clause 170, wherein obtaining the motion sensor data, embedding the motion data, and inserting the indication are performed in a wearable device.

Clause 177 includes the method of Clause 176, wherein the wearable device includes a headphone device.

Clause 178 includes the method of Clause 176, wherein the wearable device includes a smart watch device.

Clause 179 includes the method of Clause 176, wherein the wearable device includes at least one of a virtual reality headset, a mixed reality headset, or an augmented reality headset.

Clause 180 includes the method of any of Clause 162 to Clause 170, wherein obtaining the motion sensor data, embedding the motion data, and inserting the indication are performed in at least one of a virtual reality headset, a mixed reality headset, or an augmented reality headset.

Clause 181 includes the method of any of Clause 162 to Clause 170, wherein obtaining the motion sensor data, embedding the motion data, and inserting the indication are performed in a vehicle.

According to Clause 182, a device includes: a memory configured to store instructions; and one or more processors coupled to the memory and configured to execute the instructions to perform the method of Clause 162.

According to Clause 183, an apparatus includes: means for performing the method of Clause 162.

According to Clause 184, a non-transitory computer-readable medium includes instructions that, when executed by one or more processors, cause the one or more processors to perform the method of Clause 162.

According to Clause 185, an apparatus includes: means for obtaining motion sensor data; means for embedding, in a media packet, motion data corresponding to the motion sensor data; and means for inserting, into the media packet, an indication that the media packet includes the motion data.

According to Clause 186, a non-transitory computer-readable medium includes instructions that, when executed by one or more processors, cause the one or more processors to: obtain motion sensor data; embed, in a media packet, motion data corresponding to the motion sensor data; and insert, into the media packet, an indication that the media packet includes the motion data.

According to Clause 187, a device includes: a memory configured to store instructions; and one or more processors coupled to the memory and configured to execute the instructions to perform the method of any of Clause 29 to Clause 52.

According to Clause 188, an apparatus includes: means for performing the method of any of Clause 29 to Clause 52.

According to Clause 189, a non-transitory computer-readable medium includes instructions that, when executed by one or more processors, cause the one or more processors to perform the method of any of Clause 29 to Clause 52.

According to Clause 190, a device includes: a memory configured to store instructions; and one or more processors coupled to the memory and configured to execute the instructions to perform the method of any of Clause 162 to 181.

According to Clause 191, an apparatus includes: means for performing the method of any of Clause 162 to 181.

According to Clause 192, a non-transitory computer-readable medium includes instructions that, when executed by one or more processors, cause the one or more processors to perform the method of any of Clause 162 to 181.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The foregoing techniques may be performed with respect to any number of different contexts and audio ecosystems. A number of example contexts are described below, although the techniques should not be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based on one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonics audio data format, on-device rendering, consumer audio, TV, and accessories, and car audio systems.

The broadcast recording audio objects, the professional audio systems, and the consumer on-device capture may all code their output using ambisonics audio format. In this way, the audio content may be coded using the ambisonics audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonics coefficients for playback by one or more of the playback elements. For instance, a user of the mobile device may record (acquire a sound field of) a live event (e.g., a meeting, a conference, a play, a concert, etc.), and code the recording into ambisonics coefficients.

The mobile device may also utilize one or more of the playback elements to playback the ambisonics coded sound field. For instance, the mobile device may decode the ambisonics coded sound field and output a signal to one or more of the playback elements that causes the one or more of the playback elements to recreate the sound field. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonics, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonics signals. For instance, the one or more DAWs may include ambisonics plugins and/or tools which may be configured to operate with (e.g., work with) one or more game audio systems. In some examples, the game studios may output new stem formats that support ambisonics audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of the Eigen microphone may be located on the surface of a substantially spherical ball with a radius of approximately 4 centimeters (cm).

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphones may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a renderer to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a renderer to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
   a memory configured to store a media packet; and
   one or more processors coupled to the memory and configured to:
   receive the media packet;
   determine, based on a field of the media packet, whether the media packet includes motion data and audio data, wherein the motion data corresponds to motion of a second device;
   based on the media packet including the motion data, extract the motion data from the media packet;
   based on the media packet including the audio data, extract the audio data from the media packet; and
   generate adjusted spatial audio data based on the motion data and the audio data.

2. The device of claim 1, wherein the media packet includes a header and a payload, and wherein the field is in the header.

3. The device of claim 2, wherein the field includes a flag to indicate the presence or absence of the motion data in the payload.

4. The device of claim 3, wherein the flag further indicates the presence or absence of media data in the payload.

5. The device of claim 1, wherein the one or more processors are configured to:
   provide the audio data and the motion data to a shared memory coupled to the one or more processors.

6. The device of claim 1, wherein the one or more processors are configured to estimate an orientation of the second device based on the motion data.

7. The device of claim 6, wherein the one or more processors are integrated into a handset and are configured to estimate the orientation, of the second device, based on motion sensor data from a motion sensor of the handset.

8. The device of claim 6, wherein the one or more processors are configured to generate binauralized audio data for transmission to the second device.

9. The device of claim 1, wherein the one or more processors are integrated into a wearable device that includes a motion sensor and speakers, wherein the motion data corresponds to motion of a handset, wherein the handset is the second device, and wherein the one or more processors, of the wearable device, are configured to:
   estimate an orientation of the wearable device based on the motion data of the handset and further based on motion sensor data from the motion sensor; and based on the estimated orientation, generate binauralized audio data for playback via the speakers.

10. The device of claim 1, wherein the one or more processors are integrated in at least one of a mobile phone, a tablet computer device, or a camera device.

11. The device of claim 1, wherein the one or more processors are integrated in a vehicle.

12. A method comprising:
    receiving, at one or more processors, a media packet;
    determining, at the one or more processors and based on a field of the media packet, whether the media packet includes motion data and audio data, wherein the motion data corresponds to motion of a second device;
    based on the media packet including the motion data, extracting, at the one or more processors, the motion data from the media packet;
    based on the media packet including the audio data, extracting, at the one or more processors, the audio data from the media packet; and
    generating, at the one or more processors, adjusted spatial audio data based on the motion data and the audio data.

13. The method of claim 12, wherein the motion data is extracted from the media packet at a link layer of a multi-layer software stack that is lower than an application layer.

14. The method of claim 12, wherein the motion data includes motion sensor data from an inertial measurement unit of the second device.

15. The method of claim 12, wherein the motion data corresponds to orientation data of the second device.

16. A device comprising:
    a memory configured to store a media packet; and
    one or more processors coupled to the memory and configured to:
    obtain motion sensor data from one or more motion sensors, wherein the one or more motion sensors are integrated as part of an inertial measurement unit (IMU);
    embed, in the media packet, motion data based on the motion sensor data, wherein the motion data in the media packet corresponds to motion of the device; and
    embed, in the media packet, audio data, wherein the media packet is aligned such that the motion data is temporally aligned with an audio frame boundary of the audio data.

17. The device of claim 16, further comprising a modem coupled to the one or more processors and configured to send the media packet to a remote device.

18. The device of claim 16, wherein the media packet includes a header and a payload, wherein the motion data is embedded in the payload of the media packet, and wherein the one or more processors are further configured to insert, into a field in the header of the media packet, an indication that the media packet includes the motion data.

19. The device of claim 16, wherein the one or more processors are configured to initiate transmission of the media packet in an isochronous channel.

20. The device of claim 19, wherein the isochronous channel is a Bluetooth Low Energy channel.

21. The device of claim 16, wherein the one or more processors are configured to insert, into a field in a header of the media packet, an indication that the media packet includes the audio data.

22. The device of claim 16, wherein the one or more processors are integrated in at least one of a mobile phone, a tablet computer device, or a camera device.

23. The device of claim 16, wherein the one or more processors are integrated in a wearable device.

24. The device of claim 16, wherein the one or more processors are integrated in at least one of a virtual reality headset, a mixed reality headset, or an augmented reality headset.

25. The device of claim 16, wherein the one or more processors are integrated in a vehicle.

26. A method comprising:
obtaining, at one or more processors in a device, motion sensor data from one or more motion sensors, wherein the one or more motion sensors are integrated as part of an inertial measurement unit (IMU);
embedding, at the one or more processors and in a media packet, motion data that is based on the motion sensor data and that corresponds to motion of the device;
embedding, at the one or more processors, audio data in the media packet; and
inserting, at the one or more processors into a field in a header of the media packet, a first indication that the media packet includes the presence or absence of the motion data and a second indication that the media packet includes the presence or absence of the audio data.

27. The method of claim 26, further comprising sending the media packet to a remote device.

28. A device comprising:
a memory configured to store a media packet; and
one or more processors coupled to the memory and configured to:
obtain motion sensor data from one or more motion sensors, wherein the one or more motion sensors are integrated as part of an inertial measurement unit (IMU);
embed, in the media packet, motion data that is based on the motion sensor data and that corresponds to motion of the device;
embed audio data in the media packet; and
insert, into a field in a header of the media packet, a first indication that the media packet includes the presence or absence of the motion data and a second indication that the media packet includes the presence or absence of the audio data.

29. The device of claim 28, wherein the one or more processors are configured to send the media packet to a remote device.

* * * * *